United States Patent
Park et al.

(10) Patent No.: US 10,501,015 B2
(45) Date of Patent: *Dec. 10, 2019

(54) EXTENDED VIEW METHOD, APPARATUS, AND SYSTEM

(71) Applicant: Samsung Electronics Co., Ltd., Suwon-si (KR)

(72) Inventors: Chang-soon Park, Chungju-si (KR); Young-jun Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,369

(22) Filed: Feb. 5, 2018

(65) Prior Publication Data

US 2018/0154832 A1 Jun. 7, 2018

Related U.S. Application Data

(63) Continuation of application No. 14/939,399, filed on Nov. 12, 2015, now Pat. No. 9,884,590.

(30) Foreign Application Priority Data

May 11, 2015 (KR) .................. 10-2015-0065607

(51) Int. Cl.
*G09G 5/00* (2006.01)
*B60R 1/00* (2006.01)
(Continued)

(52) U.S. Cl.
CPC .............. B60R 1/00 (2013.01); *G06T 3/0062* (2013.01); *G06T 11/60* (2013.01); *H04N 5/247* (2013.01);
(Continued)

(58) Field of Classification Search
CPC ........ G06T 19/006; G06T 19/00; G06F 3/011; G06F 3/012; G02B 27/017
(Continued)

(56) References Cited

U.S. PATENT DOCUMENTS 5,259,037 A * 11/1993 Plunk .................... G01C 11/02
348/123
8,643,715 B2 2/2014 Cho
(Continued)

FOREIGN PATENT DOCUMENTS

CN 101242523 A 8/2008
EP 1 179 958 A1 2/2002
(Continued)

OTHER PUBLICATIONS

Takai, I., etc., Optical Vehicle-to-Vehicle Communication System Using LED Transmitter and Camera Receiver, Oct. 2014, [Online], [Retrieved on Mar. 14, 2019]. Retrieved from the Internet: <URL: https://ieeexplore.ieee.org/stamp/stamp.jsp?arnumber=6887317> (Year: 2014).*

(Continued)

*Primary Examiner* — Gordon G Liu
(74) *Attorney, Agent, or Firm* — NSIP Law

(57) ABSTRACT

Provided is an extended view method and apparatus, the method including generating a virtual viewpoint image of a vehicle based on a surrounding view of the vehicle, generating an extended virtual viewpoint image based on the virtual viewpoint image of the vehicle and a received virtual viewpoint image of another vehicle, and displaying the extended virtual viewpoint image to a user.

25 Claims, 25 Drawing Sheets

(51) Int. Cl.
  *H04N 7/18* (2006.01)
  *G06T 11/60* (2006.01)
  *H04N 5/247* (2006.01)
  *G06T 3/00* (2006.01)

(52) U.S. Cl.
  CPC ........ *H04N 7/181* (2013.01); *B60R 2300/105* (2013.01); *B60R 2300/303* (2013.01); *B60R 2300/50* (2013.01); *B60R 2300/607* (2013.01); *G06T 2207/20221* (2013.01); *G06T 2207/30252* (2013.01)

(58) Field of Classification Search
  USPC .......................................................... 345/633
  See application file for complete search history.

(56) References Cited

U.S. PATENT DOCUMENTS

| | | |
|---|---|---|
| 2007/0139523 A1 | 6/2007 | Nishida et al. |
| 2008/0012940 A1 | 1/2008 | Kanaoka et al. |
| 2010/0238161 A1 | 9/2010 | Varga et al. |
| 2011/0221901 A1* | 9/2011 | Bai .................... H04L 69/04 348/148 |
| 2012/0194357 A1 | 8/2012 | Ciolli |
| 2013/0083061 A1 | 4/2013 | Mishra et al. |
| 2013/0169675 A1* | 7/2013 | Shulman ............ G01C 21/3647 345/629 |
| 2013/0285803 A1 | 10/2013 | Kang et al. |

FOREIGN PATENT DOCUMENTS

| | | |
|---|---|---|
| JP | 2001-283381 A | 10/2001 |
| JP | 2005-32696 A | 11/2005 |
| JP | 2007-156753 A | 6/2007 |
| JP | 4681432 B2 | 5/2011 |
| JP | 4752486 B2 | 8/2011 |
| KR | 10-0851900 B1 | 8/2008 |
| KR | 10-2009-0109312 A | 10/2009 |
| KR | 10-1015952 B1 | 2/2011 |
| KR | 10-1097063 B1 | 12/2011 |
| KR | 10-2012-0137818 A | 12/2012 |
| KR | 10-1359660 B1 | 2/2014 |

OTHER PUBLICATIONS

European Search Report dated Sep. 14, 2016 in European Patent Application No. 161508908.8 (6 pages, in English).

Summons to Attend Oral Proceedings issued on Apr. 25, 2019 in counterpart European Application No. 16150890.8 (7 pages in English).

Chinese Office Action issued on Aug. 27, 2019 in counterpart Chinese Patent Application No. 201610032910.7 (23 pages in English and 12 pages in Chinese).

* cited by examiner

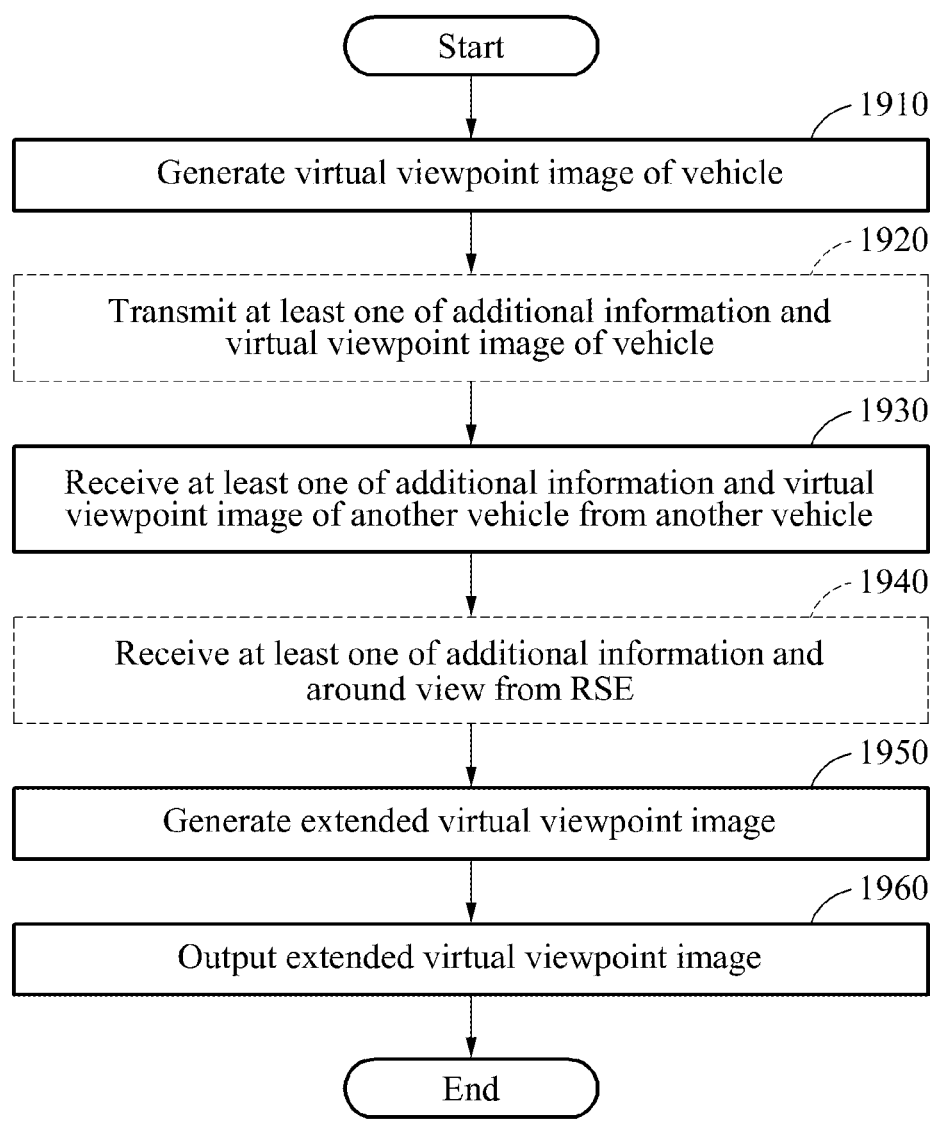

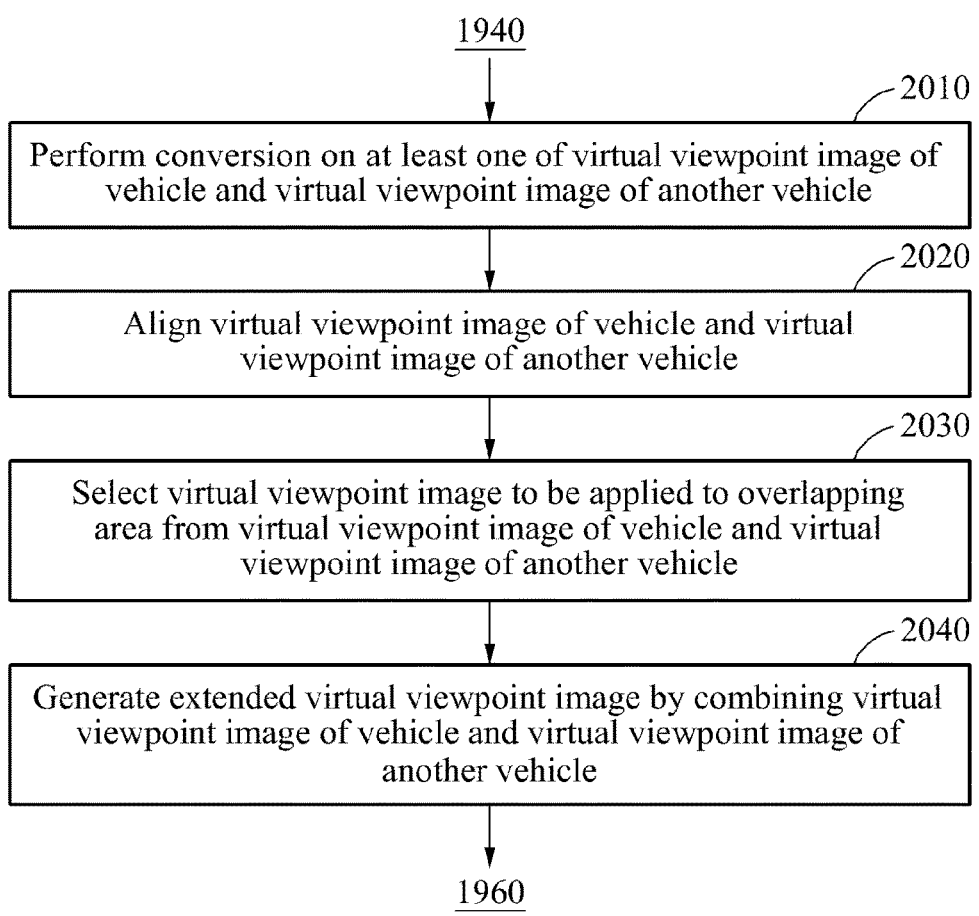

EXTENDED VIEW METHOD, APPARATUS, AND SYSTEM

CROSS-REFERENCE TO RELATED APPLICATION(S)

This application is a Continuation Application of U.S. application Ser. No. 14/939,399 filed on Nov. 12, 2015, which claims the benefit under 35 USC 119(a) of Korean Patent Application No. 10-2015-0065607, filed on May 11, 2015, in the Korean Intellectual Property Office, the entire disclosure of which is incorporated herein by reference for all purposes.

BACKGROUND

1. Field

One or more embodiments relate to an extended view method, apparatus, and system.

2. Description of Related Art

Recently, with developments in the vehicle industry, various technologies for enhancing vehicle safety and driving convenience of a driver are being applied to vehicles. Among the various technologies, and as only an example, an around view monitoring (AVM) system may enable a driver to conveniently visualize information about an environment surrounding a vehicle by displaying a view from images, captured by the vehicle, of areas or regions surrounding the vehicle. For example, in such an AVM system, cameras may be installed on front, rear, left, and right sides of the vehicle to capture respective images of the environment surrounding the vehicle that may be displayed on a screen in the vehicle. As only an example, based on the displayed environment surrounding the vehicle, the driver may more accurately recognize a current situation in an immediate vicinity of the vehicle.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

One or more embodiments provide a surround viewing method, the method including generating, by a first vehicle, a first virtual viewpoint image of the first vehicle based on at least one captured surrounding view image of the first vehicle, receiving a second virtual viewpoint image, for a surrounding view image of a second vehicle, from the second vehicle, generating, by the first vehicle, an extended virtual viewpoint image based on a combining of image information from the first virtual viewpoint image and the second virtual viewpoint image, and outputting the generated extended virtual viewpoint image.

The outputting of the generated extended virtual viewpoint image may include outputting the generated extended virtual viewpoint image to a display and controlling the display to display the extended virtual viewpoint image with additional information received from the second vehicle regarding the second vehicle and/or an object in a region in the received second virtual viewpoint image.

The method may further include controlling a capturing of the at least one surrounding view image by one or more cameras of the first vehicle.

The method may further include receiving the at least one captured surrounding view image of the first vehicle from a road side equipment (RSE) separate from the first vehicle.

The generating of the extended virtual viewpoint image may include adjusting a position of at least one of a virtual viewpoint of the first virtual viewpoint image and a virtual viewpoint of the second virtual viewpoint image, and generating the extended virtual viewpoint image based on a result of the adjusting.

The generating of the extended viewpoint image may include adjusting an image size of at least one of the first virtual viewpoint image and the second virtual viewpoint image, and generating the extended virtual viewpoint image based on a result of the adjusting.

The adjusting of the image size may further include adjusting the image size of at least one of the first virtual viewpoint image and the second virtual viewpoint image based on at least one of position information of respective virtual viewpoints of the first and second virtual viewpoint images, angle information of the respective virtual viewpoints, and respective scale information of the first and second virtual viewpoint images.

The generating of the extended virtual viewpoint image may include aligning the first virtual viewpoint image and the second virtual viewpoint image based on a determined correlation between the first virtual viewpoint image and the second virtual viewpoint image or a determined location relationship between the first vehicle and the second vehicle.

The generating of the extended virtual viewpoint image may include adjusting, based on a result of the aligning, a position of a virtual viewpoint of the second virtual viewpoint image to be at a same position as a virtual viewpoint of the first virtual viewpoint image.

The generating of the extended virtual viewpoint image may include selecting between one of the first and second virtual viewpoint images to use to generate an overlapping area of the extended virtual viewpoint image, the overlapping area representing a same area that is included in both the first virtual viewpoint image and the second virtual viewpoint image, and generating the extended virtual viewpoint image by combining the first virtual viewpoint image and the second virtual viewpoint image based on a result of the selecting.

The selecting may include selecting between one of the first and second virtual viewpoint images to use to generate the overlapping area based on at least one of an image resolution and a quality of communication with respective regard to each of the first virtual viewpoint image and the second virtual viewpoint image.

The method may further include receiving, from road side equipment (RSE), a surrounding view image of a surrounding region of the RSE, wherein the generating of the extended virtual viewpoint image may include generating the extended virtual viewpoint image by combining the first virtual viewpoint image, the second virtual viewpoint image, and the surrounding view image received from the RSE.

The method may further include adjusting a position of a virtual viewpoint of the first virtual viewpoint image, based on a location of the second vehicle, to generate an adjusted first virtual viewpoint image, and transmitting, to the second vehicle, the adjusted first virtual viewpoint image.

The method may further include transmitting additional information to the second vehicle, wherein the additional information may include at least one of identification (ID)

information of the first vehicle, speed information of the first vehicle, height information of a virtual viewpoint of the first virtual viewpoint image, angle information of the virtual viewpoint of the first virtual viewpoint image, resolution information of the first virtual viewpoint image, scale information computed by the first vehicle, location information of the first vehicle, and traffic information obtained by the first vehicle.

The generating of the first virtual viewpoint image may include generating a top-view image of the first vehicle based on the at least one captured surrounding view image.

The generating of the first virtual viewpoint image may include generating the top-view image by reducing respective distances between pixels corresponding to a short-range region of the at least one captured surrounding view image relative to a location of the first vehicle and increasing respective distances between pixels corresponding to a long-range region of the at least one captured surrounding view image relative to a location of the first vehicle.

The method may further include receiving additional information from the second vehicle, wherein the additional information may include at least one of ID information of the second vehicle, speed information of the second vehicle, height information of a virtual viewpoint of the second virtual viewpoint image, angle information of the virtual viewpoint of the second virtual viewpoint image, resolution information of the second virtual viewpoint image, scale information computed by the second vehicle, location information of the second vehicle, and traffic information obtained using the second vehicle.

The generating of the extended virtual viewpoint image may include combining image information from the first virtual viewpoint image and the second virtual viewpoint image with image information representing one or more of the additional information received from the second vehicle.

The outputting of the generated extended virtual viewpoint image may include incorporating at least one of traffic information and obstacle information in the extended virtual viewpoint image.

The extended virtual viewpoint image may omnidirectionally represent a region surrounding the first vehicle that is larger than a region surrounding the first vehicle represented by the first virtual viewpoint image of the first vehicle.

One or more embodiments provide a surround viewing method performed by a first vehicle, the method including receiving, from a second vehicle, a virtual viewpoint image of the second vehicle, for a surrounding view of the second vehicle, adjusting at least one of an image size of a generated virtual image of the first vehicle, an image size of the received virtual image of the second vehicle, a position of a virtual viewpoint of the generated virtual viewpoint image of the first vehicle, and a position of a virtual viewpoint of the received virtual viewpoint image of the second vehicle, to respectively generate an adjusted virtual image of the first vehicle and/or adjusted virtual image of the second vehicle, generating an extended virtual viewpoint image by combining one of the generated virtual image of the first vehicle and the adjusted virtual viewpoint image of the first vehicle with one of the received virtual viewpoint image of the second vehicle and the adjusted virtual viewpoint image of the second vehicle, based on a result of the adjusting, and outputting the generated extended virtual viewpoint image.

The method may further include outputting the generated extended virtual viewpoint image to a display and controlling the display to display the extended virtual viewpoint image with additional information received from the second vehicle regarding the received virtual viewpoint image of the second vehicle.

The method may further include transmitting the generated virtual viewpoint image of the first vehicle or the adjusted virtual viewpoint image of the first vehicle to the second vehicle with additional information regarding the generated virtual viewpoint image of the first vehicle.

One or more embodiments provide a non-transitory recording medium including processor readable code to control at least one processing device to implement one or method embodiments discussed herein.

One or more embodiments provide a surround viewing system, the system including a virtual viewpoint image generator configured to generate a first virtual viewpoint image of a first vehicle based on at least one captured surrounding view image of the first vehicle, a receiver configured to receive, from a second vehicle, a second virtual viewpoint image of the second vehicle for a surrounding view image of the second vehicle, an extended virtual viewpoint image generator configured to generate an extended virtual viewpoint image by combining image information from the generated first virtual viewpoint image and the received second virtual viewpoint image, and a display configured to display the generated extended virtual viewpoint image.

The system may be the first vehicle that also includes at least a camera to capture the at least one surrounding view image of the first vehicle.

The system may further include at least a camera to capture the at least one surrounding view image of the first vehicle, and a transmitter, wherein the system may be configured to control the transmitter to transmit the first virtual viewpoint image to the second vehicle.

The extended virtual viewpoint image generator may include an image converter configured to adjust at least one of an image size of the generated first virtual viewpoint image, an image size of the received second virtual viewpoint image, a position of a virtual viewpoint of the generated first virtual viewpoint image, and a position of a virtual viewpoint of the received second virtual viewpoint image, to respectively generate an adjusted virtual image of the first vehicle and/or adjusted virtual image of the second vehicle, an image aligner configured to align one of the generated first virtual viewpoint image and the adjusted first viewpoint image with one of the received second virtual viewpoint image and the adjusted second viewpoint image, to generate aligned first and second virtual viewpoint images, based on a result of the adjusting, an image selector configured to select between one of the aligned first and second virtual viewpoint images to use to generate an overlapping area of the extended viewpoint image, the overlapping area representing a same area that is included in both the aligned first and second virtual viewpoint images, and an image generator configured to generate the extended virtual viewpoint image by combining the aligned first and second virtual viewpoint images based on a result of the selecting.

Other features and aspects will be apparent from the following detailed description, the drawings, and the claims.

BRIEF DESCRIPTION OF THE DRAWINGS

These and/or other aspects will become apparent and more readily appreciated from the following description of example embodiments, taken in conjunction with the accompanying drawings of which:

FIG. 19 illustrates a surround viewing method, according to one or more embodiments.

FIG. 20 illustrates a surround viewing method, according to one or more embodiments.

DETAILED DESCRIPTION

Figure 1A:
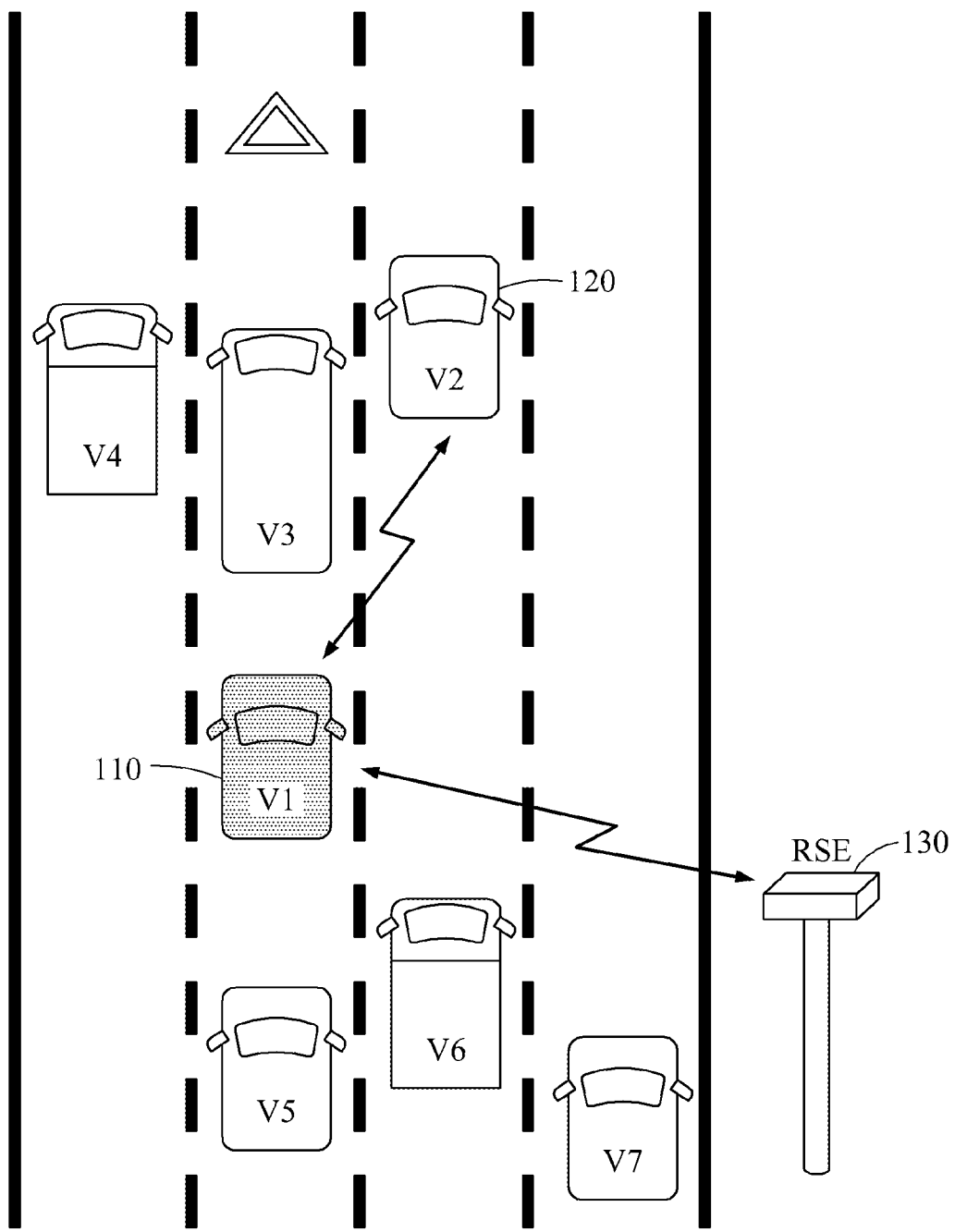
FIGS. 1A-1F illustrate examples of wireless cooperative communication performed in a road environment including a plurality of vehicles and road side equipment (RSE), according to one or more embodiments.

The following detailed description is provided to assist the reader in gaining a comprehensive understanding of the methods, apparatuses, and/or systems described herein. However, after an understanding of the present disclosure, various changes, modifications, and equivalents of the methods, apparatuses, and/or systems described herein will be apparent to one of ordinary skill in the art. The sequences of operations described herein are merely examples, and are not limited to those set forth herein, and may be changed as will be apparent to one of ordinary skill in the art, with the exception of operations necessarily occurring in a certain order. In addition, descriptions of functions and constructions that may be well known to one of ordinary skill in the art may be omitted for increased clarity and conciseness.

The features described herein may be embodied in different forms, and are not to be construed as being limited to the examples described herein.

Various alterations and modifications may be made to the embodiments, some of which will be illustrated in detail in the drawings and detailed description. However, it should be understood that these embodiments are not construed as limited to the illustrated forms and include all changes, equivalents, or alternatives within the idea and the technical scope of this disclosure.

Terms used herein are to merely explain specific embodiments, thus are not meant to be limiting. A singular expression includes a plural expression except when two expressions are contextually different from each other. For example, as used herein, the singular forms "a," "an" and "the" are intended to include the plural forms as well, unless the context clearly indicates otherwise. Herein, a term "include" or "have" are also intended to indicate that characteristics, figures, operations, components, or elements disclosed on the specification or combinations thereof exist. The term "include" or "have" should be understood so as not to pre-exclude the existence of one or more other characteristics, figures, operations, components, elements or combinations thereof or additional possibilities.

Unless otherwise defined, all terms including technical and scientific terms used herein have the same meaning as commonly understood by one of ordinary skill in the art to which this invention may belong, in view of the present disclosure. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Hereinafter, certain embodiments will be explained in more detail with reference to the attached drawings, wherein like reference numerals refer to like elements throughout. The drawings may not be to scale, and the relative size, proportions, and depiction of elements in the drawings may be exaggerated for clarity, illustration, and convenience. Like or the same component or components corresponding to each other will be provided with the same reference numeral, and their repeated detailed explanation may be omitted. In addition, when it is determined that a detailed description of a related or known function or configuration may make a purpose of an embodiment of the present disclosure unnecessarily ambiguous, such a detailed description may be omitted.

Hereinafter, as only an example, a road environment may be an environment that includes one or more vehicles on a road and may include road side equipment (RSE) above or along a road side. Depending on example, a few vehicles may be stopped or parked on or alongside the road. One or more of the vehicles may communicate with another vehicle or the RSE based on wireless communication. The RSE may be, for example, an infrastructure installed at a predetermined position above or on a road or above, on, or along the road side, as only examples, configured to communicate with vehicles located within a predetermined distance or range from the RSE, for example. Alternatively, the RSE may be, for example, a mobile platform distinct from the vehicles on the road. As noted below, such an RSE may include one or more cameras. The RSE may also be an intelligent road sign or other infrastructure at or near the road or road side, for example.

FIGS. 1A-1F illustrate a wireless cooperative communication performed in a road environment including a plurality of vehicles and RSE, according to one or more embodiments. FIGS. 1A-1F illustrate a road environment including RSE 130 and a plurality of vehicles, for example, a vehicle V1 110, a vehicle V2 120, a vehicle V3 125, a vehicle V4, a vehicle V5, a vehicle V6 135, and a vehicle V7 145 travelling on a road. Below, FIGS. 1B through 1D more particularly illustrate examples of areas of the road that may be viewed/captured by the vehicles or the RSE, and FIGS. 1E and 1F more particularly illustrate examples of a resultant viewed region that will be acquired or derived by the vehicle V1 110 through such wireless communication, according to one or more embodiments Here, the vehicle V1 110 is being used as a reference, e.g., below explanations of such a wireless communication approach may be from the perspective of the example vehicle V1 110. The vehicle V1 110 may perform data transmission and reception with other vehicles or the RSE 130 based on a wireless communication scheme, such as according to any of the Wireless Access in/for Vehicular Environments (WAVE) IEEE 802.11p, IEEE 1609, or similar standardization schemes, as only non-limiting examples and noting that alternative wireless communication schemes may be used. The example WAVE scheme is, for example, a mobile communication technology and approach designed to be suitable for a high speed driving or traveling environment. As noted, the wireless communication scheme may be a wireless cooperative communication system or scheme, where one or more vehicles and/or RSE's may operate as nodes of the system and cooperate to share information, such as their respective sensor information, between each other. For example, each of the vehicles may share their speed, acceleration, and/or direction of travel, so each example vehicle may know the speeds, acceleration, and/or directions of travel of nearby vehicles, such information may similarly be respectively shared between each of the vehicles and one or more nearby RSE's. Accordingly, in an example wireless cooperative communications embodiment, multiple vehicles may share their information with each other and/or with one or more RSE's, and likewise the RSE's may share information with each other and/or one or more vehicles, etc. As only an example, a determining factor for whether two vehicles, a vehicle and an RSE, or two RSE's share their respectively collected information may be whether a direct wireless connection can be made between the two respective nodes, i.e., between the two vehicles, the vehicle and the RSE, or the two RSE's, such as depending on signal strength and range of the respective transmitters and receivers of the vehicle and RSE devices. Accordingly, returning to FIG. 1A, and in such an example cooperative communication system or scheme, the vehicle V1 110 may receive image data and/or traffic data from the vehicle V2 120 and/or the RSE 130 while traveling on the road, and/or may broadcast acquired image data and/or traffic data to one or more of the RSE 130, the vehicle V2 120, the vehicle V3 125, the vehicle V4, the vehicle V5, the vehicle V6 135, and the vehicle V7 145. In an embodiment, such a broadcasting of the acquired image data and/or traffic data, which may include the aforementioned example speed, acceleration, and direction of travel, may be performed autonomously or automatically, such as based on a respectively predetermined duty cycle or respective information availability for transmitting each type of information to the other vehicles and/or RSE's.

As noted above, the RSE 130 may monitor road conditions, such as by using an image acquiring device included in the RSE 130 or other sensors in or around the road that may provide information about such road conditions. The road condition information may represent such information as the current condition, or expected condition, of a road surface and/or other traffic information. The RSE may also provide information relayed from remote site/location that has collected such road condition information. With the image acquiring device, the RSE 130 may capture a surrounding view representing a surrounding region of the RSE 130.

Figure 1B:
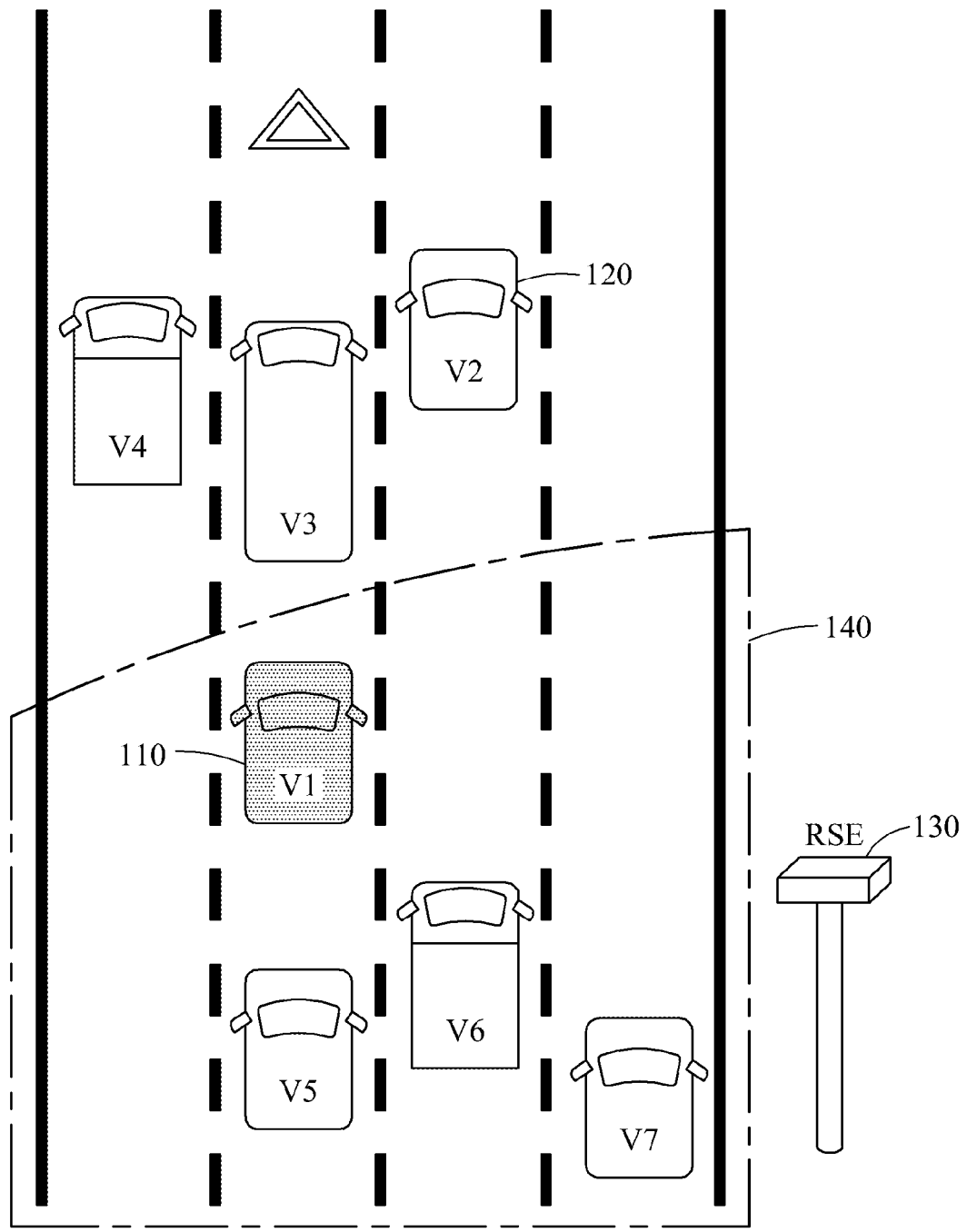

FIG. 1B illustrates a road region 140 that may be monitored by the RSE 130 using its image acquiring device, for example, a camera. As an example, the RSE 130 may monitor the road conditions at a relatively high position compared to the elevation of the vehicle V1 110, the vehicle V2 120, the vehicle V3 125, the vehicle V4, the vehicle V5, the vehicle V6 135, and the vehicle V7 145. In this example, with this example RSE 130 having a higher elevation, the RSE 130 may monitor a road region within a range visible by the image acquiring device without the differing vehicles obscuring the image acquiring device's overall view.

Figure 1C:
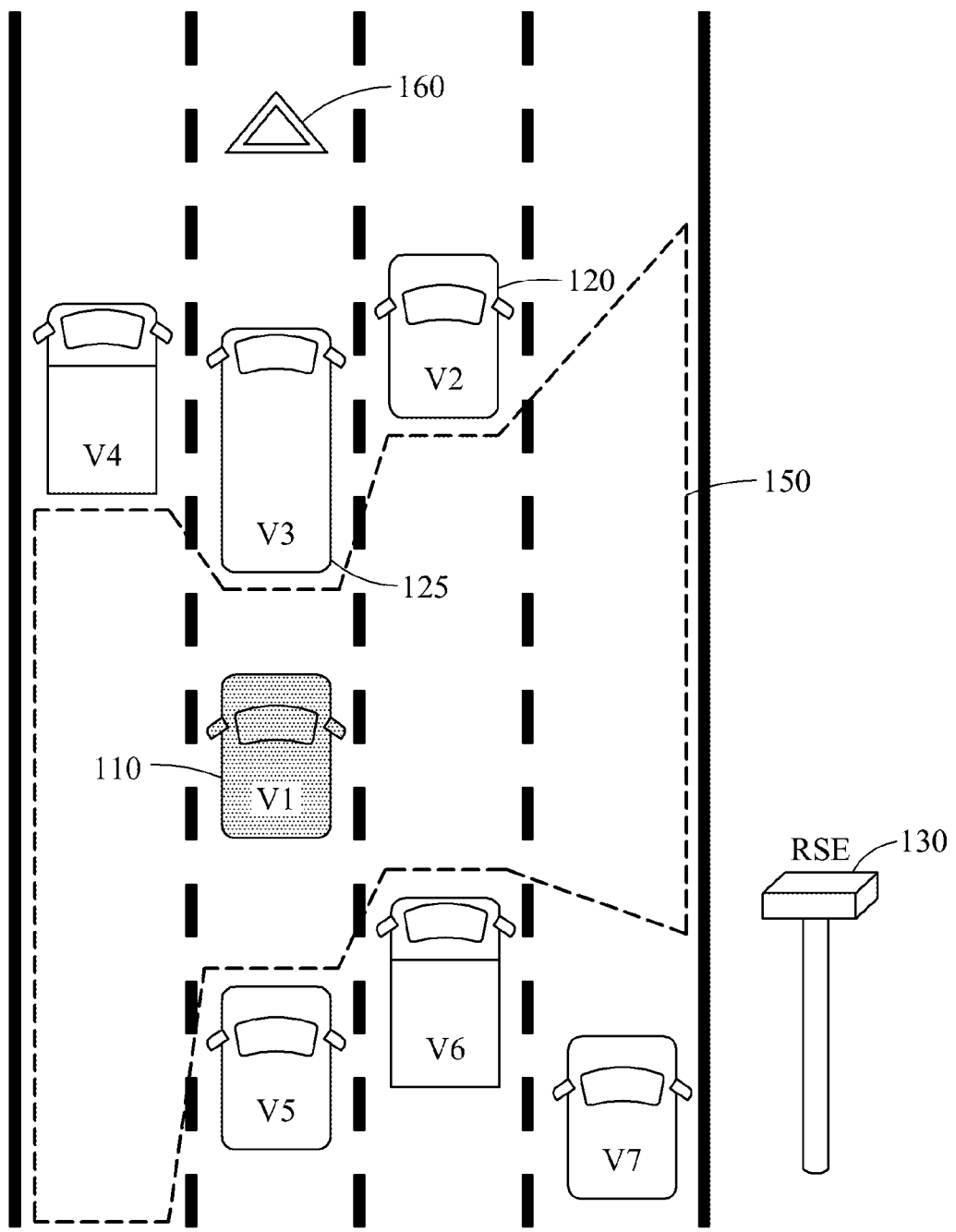
Figure 1D:
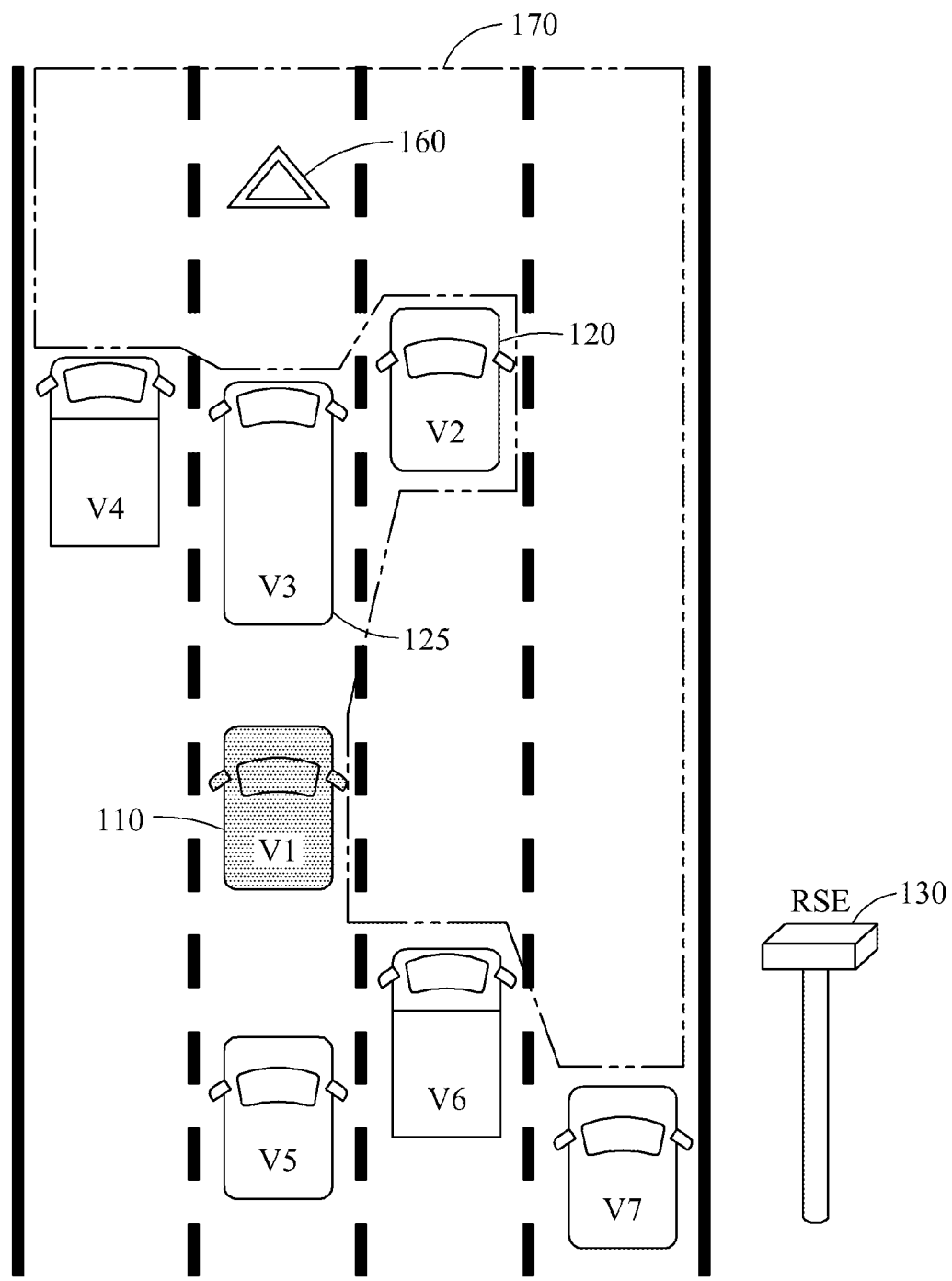

With respect to FIGS. 1C and 1D, each of the vehicle V1 110 and the vehicle V2 120, for example, may monitor a surrounding region using their respective image acquiring devices, and respectively create surrounding views representing the respective surrounding region for each of vehicle V1 110 and vehicle V2 120.

Accordingly, FIG. 1C illustrates a road region 150 that may be monitored by the vehicle V1 110 using the image acquiring device of the vehicle V1 110, while FIG. 1D illustrates a road region 170 that may be monitored by the vehicle V2 120 using the image acquiring device of the vehicle V2 120. The extent of the road region 150 may be limited by the occurrence or placement of the vehicle V2 120, the vehicle V3 125, the vehicle V4, the vehicle V5, and the vehicle V6 135 relative to the vehicle V1 110. Similarly, the extent of the road region 170 may be limited by the occurrence or placement of the vehicle V1 110, the vehicle V3 125, the vehicle V4, the vehicle V6 135, and the vehicle V7 145. Here, in the example of FIG. 1C, the viewable extent of the road region 150 captured by the vehicle V1 110 may be limited or blocked by the vehicle V3 125 and thus, an obstacle 160 located in front of the vehicle V3 125 may be invisible or imperceptible to the vehicle V1 110, while the obstacle 160 will be visible to the vehicle V2 120 and included in the road region 170 captured by the vehicle V2 120.

Figure 1E:
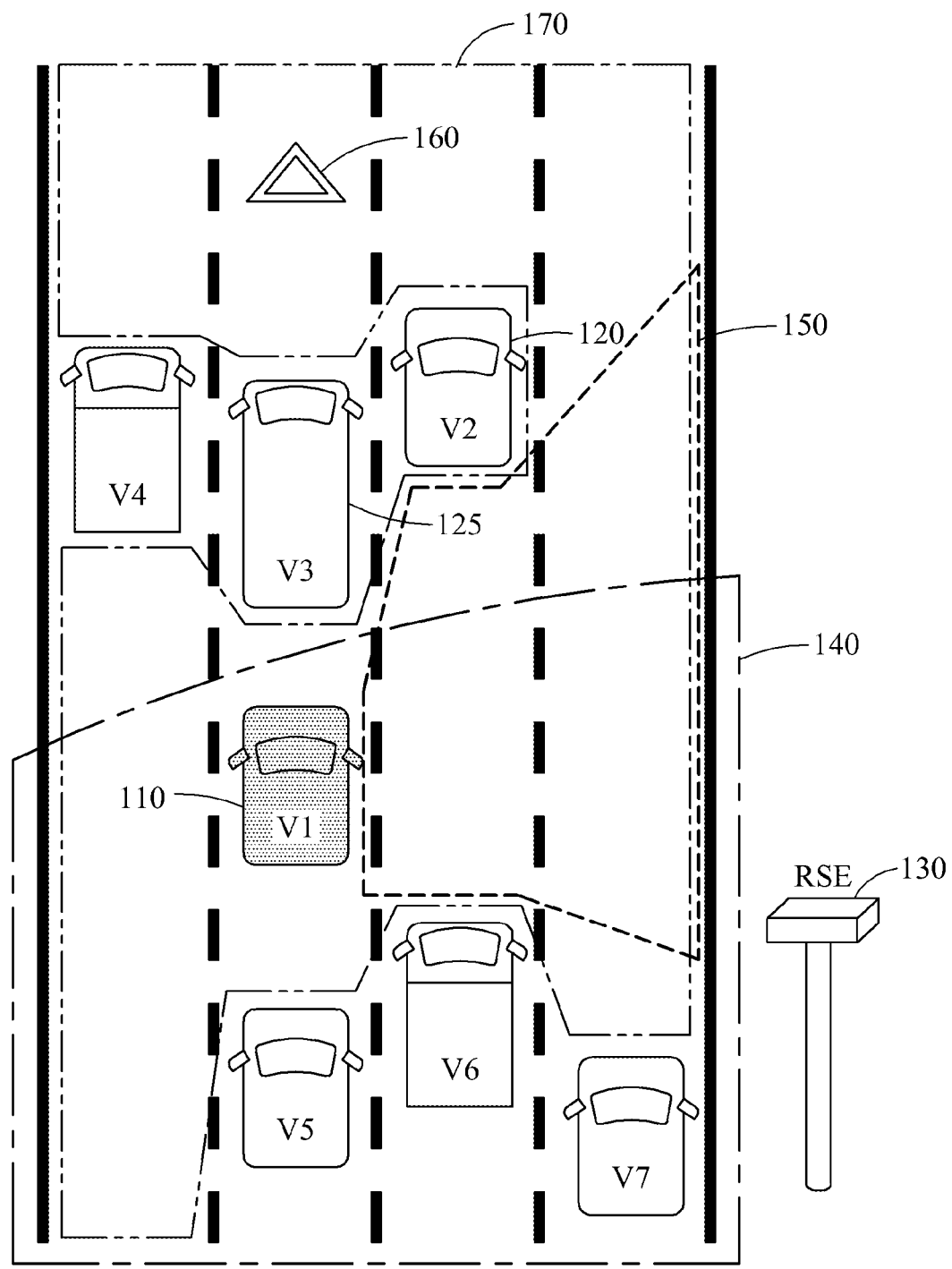

As noted above, the vehicle V1 110 may receive respective road monitoring image information provided by at least one of the RSE 130 and the other vehicles through the wireless cooperative communication. Based on the received image information, the vehicle V1 110 may collect image information of a region larger than the road region 150. For example, as illustrated in FIG. 1E, the vehicle V1 110 may collect or derive image information of the road region 170 monitored by the vehicle V2 120 and image information of the road region 140 monitored by the RSE 130 as well as the image information of the road region 150 monitored by the vehicle V1 110, resulting in a collected region that is larger than the limited road region 150.

Figure 1F:
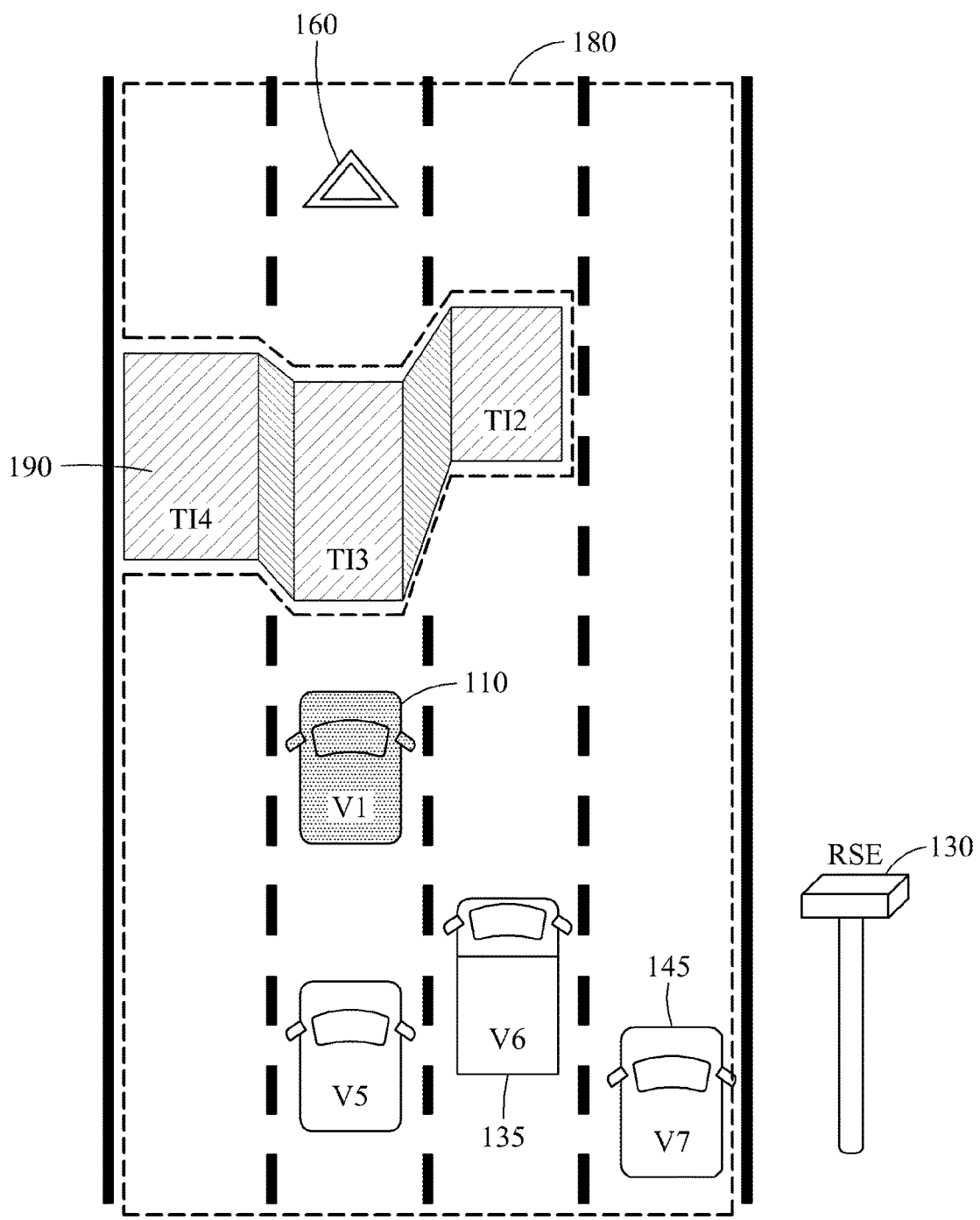

In an embodiment, the vehicle V1 110 may combine autonomously or automatically monitored image information of the surroundings of the vehicle V1 110 with the image information received from each of the vehicle V2 120 and the RSE 130. In an embodiment, each of the vehicle V2 120 and the RSE 130 may also autonomously or automatically be providing their respective monitored image information to the vehicle V1 110, as well as the other vehicles. In this example where the vehicle V1 110 combines the differing image information from differing sources, FIG. 1F illustrates that the vehicle V1 110 may ultimately collect image information sufficient to represent of the illustrated road region 180. Depending on embodiment, the resultant image information of the road region 180 may be provided to a driver of the vehicle V1 110 in a form of a top-view image acquired by capturing the road conditions from above the road, for example.

In FIG. 1F, the illustrated images 112, 113, and 114 of an area 190, indicated by hatching lines, respectively correspond to top-view, or downward looking, images of the vehicles V2 120, the vehicle V3 125, and the vehicle V4. When it is or becomes difficult to collect the actual top-view images of the vehicles V2 120, the vehicle V3 125, and the vehicle V4, or these images are not available, respective virtual vehicle images for images 112, 113, and 114 or a predetermined highlighting color may be displayed in place of the images 112, 113, and 114. When the virtual vehicle images are used, a previously stored or generic corresponding vehicle image stored in the vehicle V1 110, or vehicle images received from the vehicles V2 120, the vehicle V3 125, and the vehicle V4, may be used.

While driving or traveling, the driver of the vehicle V1 110 may be blocked by another vehicle, or due to a road structure, from viewing or seeing an obstacle, such as obstacle 160. An obstacle, a moving object, an accident scene, and the like for example, included in a region that is invisible or imperceptible to the driver may increase an accident risk. The accident risk may also increase due to a high speed of another vehicle and abnormal conditions of the surface of a road affected by weather. As illustrated in FIG. 1F, the vehicle V1 110 may provide a driver information on the road region 180, beyond the road region 150 monitored by the vehicle V1 110, thereby enhancing safety and convenience in driving.

As an example, in response to the information on the road region 180 provided from the vehicle V1 110, the driver may acknowledge a presence of the obstacle 160 obscured by the vehicle V3 125 beforehand and then prepare for a potential future incident. Similarly, when the vehicle V7 145 advances at a relatively high speed, the driver of the vehicle V1 110 may acknowledge the high speed of the vehicle V7 145 obscured by the vehicle V6 135 based on the information on the road region 180, thereby preparing for the high speed of the vehicle V7 145. In addition, the driver of the vehicle V1 110 may base their determination of when or whether to change lanes based on the information on the road region 180, thereby enhancing safety and convenience in driving.

As discussed below with regard to FIG. 2, information on the road region 180 may be provided to the driver or passengers of the vehicle V1 110 in a form of a virtual viewpoint image through a surround viewing system 200 to provide an extended surrounding view of a vehicle. In an example, each of the vehicle V1 110, the vehicle V2 120, the vehicle V3 125, the vehicle V4, the vehicle V5, the vehicle V6 135, and the vehicle V7 145 may include a respective surround viewing system 200 to collect their respective sensed information, e.g., such as their respectively captured image information, and such sensed and road condition information of a region monitored by the example RSE 130 and/or of the respective regions monitored by the other vehicles, through the wireless cooperative communication. Through these respective processes, each of the vehicle V1 110, the vehicle V2 120, the vehicle V3 125, the vehicle V4, the vehicle V5, the vehicle V6 135, and the vehicle V7 145, for example, may provide their respective drivers/passengers with images that represent extended region(s) surrounding the respective vehicle. In addition, the RSE 130 may include such a system 200, or a system with less than all of the components of the system 200, and accordingly similarly receive image and traffic information on the respective regions monitored by the vehicle V1 110, the vehicle V2 120, the vehicle V3 125, the vehicle V4, the vehicle V5, the vehicle V6 135, and the vehicle V7 145. In this example, the RSE 130 may include a display to locally display the collected information or may forward the collected information to a remote site/location for monitoring, such as for roadway safety management. The RSE may also merely collect, or configured to merely collect, a surrounding view that may include one or more of the vehicles and the road area, and provide that surrounding view to any of the vehicle V1 110, the vehicle V2 120, the vehicle V3 125, the vehicle V4, the vehicle V5, the vehicle V6 135, and the vehicle V7 145 as discussed in greater detail below, for example.

Figure 2:
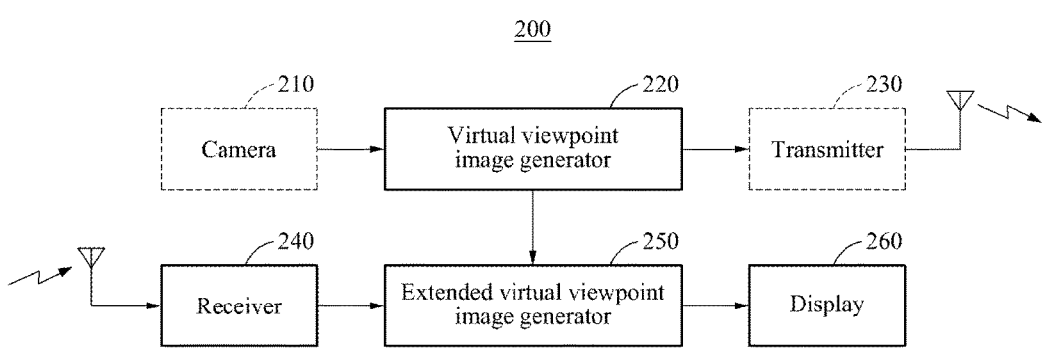
FIG. 2 illustrates a surround viewing system and method, according to one or more embodiments.

FIG. 2 illustrates a surround viewing system and method, according to one or more embodiments. Hereinafter, as only an example embodiment, the surround viewing system 200 may be a vehicle. In an embodiment, and only as an example, when the surround viewing system 200 is a vehicle, the surround viewing system 200 may display to the driver omnidirectionally, for example, in 360 degrees, a region for the vehicle that is larger than a visually observable surrounding region of the vehicle, based on at least one item of information received from another vehicle and/or RSE.

Referring to FIG. 2, the surround viewing system 200 may include an image generating apparatus that includes a virtual viewpoint image generator 220, a receiver 240, and an extended virtual viewpoint image generator 250. Alternatively, the virtual viewpoint image generator 220, receiver 240, and extended virtual viewpoint image generator 250 may be separate components of the surround viewing system 200. The image generating apparatus may further include, or as another component of the surround viewing system 200, the transmitter 230. Still further, the surround viewing system 200 may include one or more cameras 210 and display 260. The below discussed operations of each of the virtual viewpoint image generator 220, transmitter 230, receiver 240, and extended virtual viewpoint image generator 250, for example, may be implemented by at one or more processing devices, processors, or specialized computers configured to operate as respectively described below and/or through respective alternate hardware elements. Such processing devices, processors, or specialized computers may further be configured to implement the corresponding controlling of the operations of the one or more cameras 210 and display 260 to respectively capture surrounding image information and display of traffic information and any generated virtual viewpoint images or generated extended virtual viewpoint images. As still further discussed below, another embodiment may include a virtual image generator apparatus that includes such a virtual viewpoint image generator 220 and transmitter 230, for example, in a surround viewing system having such one or more of such cameras 210, that may be available for placement in or with the RSE 130 of FIG. 1, as only an example. In this example, such an alternative virtual image generator apparatus of the RSE 130 may transmit to the example vehicle V1 110, as the surround viewing system 200, at least one item of information captured (or made available to the RSE 130) that may be used by the surround viewing system 200 to generate an extended virtual viewpoint image and which the surround viewing system 200 may display as the region larger than the visually observable surrounding region of the vehicle V1 110. Alternatively, the example RSE 130 may include the surround viewing system 200 similar to the example vehicle V1 110, or the example virtual image generator apparatus of the RSE 130 may merely further include the receiver 240, or the receiver 240 and the extended virtual viewpoint image generator 250, e.g., for either local display, forwarding of any generated virtual viewpoint images to another RSE, other vehicle, or remote location or site, or forwarding of any generated extended virtual viewpoint images to such remote locations or sites, as only examples.

Accordingly, returning to an example of the vehicle V1 110 of FIG. 1 including the surround viewing system 200, with at least the virtual viewpoint image generator 220, receiver 240, and extended virtual viewpoint image generator 250, the virtual viewpoint image generator 220 may generate a virtual viewpoint image of the vehicle by capturing information of one or more regions surrounding the vehicle. The virtual viewpoint image may have a virtual viewpoint that is positioned above the vehicle where a surrounding region of the vehicle is viewed downwardly from the virtual viewpoint, e.g., as a predetermined position above the vehicle. Angle information of an elevation angle corresponding to an angle at which the virtual viewpoint is viewed upward, from a boundary of the virtual viewpoint image, or angle information of a view angle corresponding to an angle at which the surrounding region of the vehicle is viewed downward, from a position of the virtual viewpoint, may be determined for the virtual viewpoint. For example, these angles may be used to represent physical extents of the defined surrounding region captured by the reference vehicle based on the known or set elevation of the virtual viewpoint.

The virtual viewpoint image generator 220 may generate, for example, a virtual top-view image by combining separate surrounding views collected from respective capturing of images representing a view from a front side of the vehicle, a view from a rear side of the vehicle, a view from a left side of the vehicle, and a view from a right side of the vehicle, as only examples. A top-view image may be, for example, a resulting image of the surrounding region of the vehicle viewed downwardly from the virtual viewpoint set to be above the vehicle. The virtual viewpoint image generator 220 may generate the top-view image using the images of the separate surrounding views by reducing respective distances between pixels, or similarly morphing or interpolating, corresponding to a short-range region relative to the position of the vehicle and by increasing respective distances between pixels, or similarly morphing or interpolating, corresponding to a long-range region relative to the position of the vehicle.

In an example, the virtual viewpoint image generator 220 may adjust the virtual viewpoint image of the vehicle based on a determined, known, or notified position of another vehicle, and the adjusted virtual viewpoint image may be transmitted to the other vehicle through the transmitter 230, e.g., for later use by the other vehicle for generation of a similar extended virtual viewpoint image for the other vehicle. For such an adjustment, the virtual viewpoint image generator 220 may set a position of the virtual viewpoint and a view direction in which the virtual viewpoint faces under an assumption that the surrounding region of the vehicle will be viewed from the position or perspective of the other vehicle. Based on a result of the setting, the virtual viewpoint image generator 220 may adjust the virtual viewpoint image of the vehicle for a transmission to the other vehicle(s) or RSE.

When the surround viewing system 200 is the RSE, and when the RSE monitors road conditions at a sufficiently high position or elevation, an image processing procedure of the virtual viewpoint image generator 220 may be omitted.

As noted, in an example, the surround viewing system 200 may include the camera 210, which may generate a view by capturing a surrounding region of the vehicle and provide the surrounding view to the virtual viewpoint image generator 220.

Returning to the example where the surround viewing system 200 is the vehicle, the receiver 240 may receive a virtual viewpoint image from another vehicle and additional information from the other vehicle. The other vehicle may have captured surrounding view(s) for the surroundings of the other vehicle using one or more cameras of the surround viewing system 200 of the other vehicle, which generated a virtual viewpoint image for the other vehicle based on the captured surrounding view(s) and transmitted the other vehicle's generated virtual viewpoint image and any additional information of the other vehicle to the receiver 240 through the example wireless cooperative communication.

Accordingly, the receiver 240 received additional information from the other vehicle may include, for example, identification (ID) information of the other vehicle, speed information of the other vehicle, height information of a virtual viewpoint of the other vehicle's generated virtual viewpoint image, angle information of the virtual viewpoint of the other vehicle's generated virtual viewpoint image, resolution information of the other vehicle's generated virtual viewpoint image, scale information computed by the other vehicle, location information of the other vehicle, a vehicle image of the other vehicle, e.g., viewed from above the other vehicle, and traffic information obtained by the other vehicle. The angle information of the virtual viewpoint of the other vehicle's generated virtual viewpoint image may include elevation angle information or view angle information of the virtual viewpoint of the other vehicle's generated virtual viewpoint image. The height information of the virtual viewpoint of the other vehicle's generated virtual viewpoint image may indicate a height from which the surrounding region of the other vehicle is viewed downwardly to create the other vehicle's generated virtual viewpoint image. The scale information may indicate information on a ratio of an actual area of the road to an image size, e.g., the other vehicle's virtual viewpoint image. The traffic information may include information on a traffic signal, an object moving at a high speed, and an obstacle sensed by a sensor, as only examples.

The extended virtual viewpoint image generator 250 may generate an extended virtual viewpoint image based on the generated virtual viewpoint image of the vehicle and the received virtual viewpoint image of the other vehicle. The extended virtual viewpoint image generator 250 may convert the virtual viewpoint image of the vehicle and the virtual viewpoint image of the other vehicle into appropriate forms and combine the conversion results, thereby generating the extended virtual viewpoint image. Accordingly, with the potential additional viewed area provided by the virtual viewpoint image of the other vehicle, the extended virtual viewpoint image for the vehicle may represent a region larger than the region represented solely by the virtual viewpoint image of the vehicle generated by the virtual viewpoint image generator 220. Additional descriptions related to the extended virtual viewpoint image generator 250 will be provided in greater detail with reference to FIG. 3.

In an example, the receiver 240 may also, or alternatively, receive additional information and surrounding view(s) from the example RSE, the surrounding view(s) being acquired by the RSE, for example, having captured one or more surrounding regions of the RSE. From the RSE, the receiver 240 receives the additional information including any one or more of speed information of vehicles present in a viewed region, height information of a viewpoint included in the around view, location information of the RSE, scale information computed by the RSE, and traffic information obtained by the RSE, as only examples. When the receiver 240 receives such a surrounding view from the RSE, the extended virtual viewpoint image generator 250 of the vehicle may combine the virtual viewpoint image of the vehicle, the virtual viewpoint image of the other vehicle, and the surrounding view received from the RSE, thereby generating the extended virtual viewpoint image.

When the receiver 240 does not receive image information from other vehicles and the RSE, the surround viewing system 200 may display the virtual viewpoint image of the vehicle generated by the virtual viewpoint image generator 220 in lieu of a generated extended virtual viewpoint image. In this situation, where the receiver 240 does not receive such image or additional information from other vehicles or RSE's, the extended virtual viewpoint image generator 250 may not need to operate and only the virtual viewpoint image generator 220 may need to operate.

The display 260 outputs the extended virtual viewpoint image. In an example, the extended virtual viewpoint image may represent a surrounding region extended based on the vehicle being positioned at a center of the displayed extended virtual viewpoint image. The extended virtual viewpoint image may also include traffic information and obstacle information. Accordingly, the driver may be intuitively informed about the traffic information and road conditions around the vehicle based on the extended virtual viewpoint image. Through this, a driving convenience may be enhanced and a driving safety may also be enhanced according to an increase in a capability to prepare for an accident risk.

In an example, as noted, the surround viewing system 200 may further include the transmitter 230. The transmitter 230 may transmit at least one of additional information and the generated virtual viewpoint image of the vehicle to one or more other vehicles and/or one or more RSE's. This transmitted additional information may include any one or more of ID information of the vehicle, speed information of the vehicle, height information of the virtual viewpoint in the virtual viewpoint image of the vehicle, angle information of the virtual viewpoint in the virtual viewpoint image of the vehicle, resolution information of the virtual viewpoint image of the vehicle, scale information computed by the vehicle, location information of the vehicle, a vehicle image of the vehicle viewed downwardly from above, and/or traffic information obtained by the vehicle, as only examples.

Figure 3:
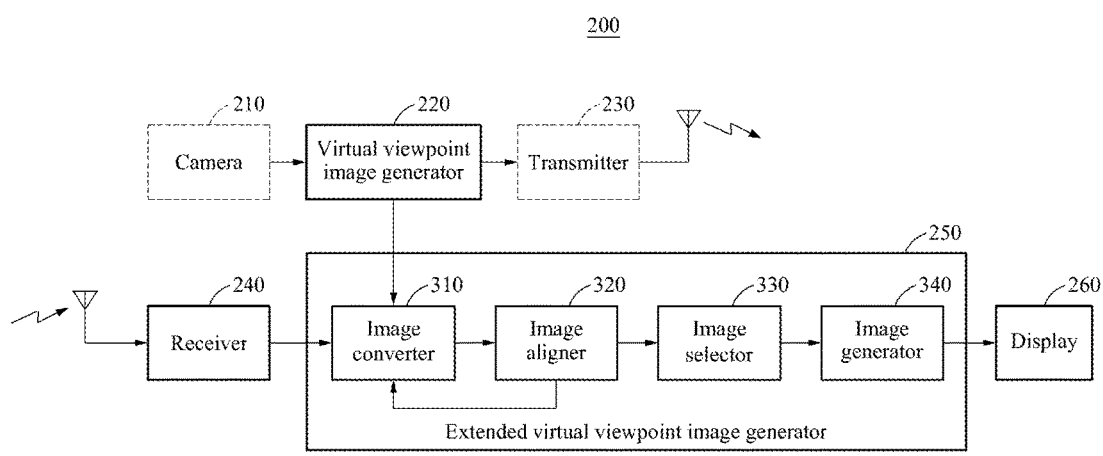
FIG. 3 illustrates an extended virtual viewpoint image generator and method, according to one or more embodiments.

FIG. 3 illustrates an extended virtual viewpoint image generator and method of the surround viewing system 200, according to one or more embodiments. Referring to FIG. 3, the extended virtual viewpoint image generator 250, for example, may include an image converter 310, an image aligner 320, an image selector 330, and an image generator 340, for example. In an embodiment, operations of each of the image converter 310, image aligner 320, image selector 330, and image generator 340 of the extended virtual viewpoint image generator 250 may be implemented by at least one processing device, processor, or specialized computer, for example.

The image converter 310 may receive a virtual viewpoint image of another vehicle from the receiver 240 and receive a virtual viewpoint image of the vehicle from the virtual viewpoint image generator 220. The image converter 310 may respectively adjust at least one of image sizes and positions of virtual viewpoints in the virtual viewpoint image of the vehicle and the virtual viewpoint image of the other vehicle, e.g., before combining the virtual viewpoint images. For example, the image converter 310 may adjust the image sizes of the virtual viewpoint images such that scales covered by the virtual viewpoint images are to be equal to one another. The image converter 310 may adjust the image sizes of the virtual viewpoint images based on information on positions and angles of the virtual viewpoints in the virtual viewpoint images or information on the scales covered by the virtual viewpoint images. Also, the image converter 310 may adjust one or more of the virtual viewpoint images to compensate for a difference in position between the viewpoints of the virtual viewpoint images. For example, the image converter 310 may adjust a height of the viewpoint in the virtual viewpoint image of the other vehicle to be equal to a height of the viewpoint in the virtual viewpoint image of the vehicle. Alternatively, the image converter 310 may adjust the position of the viewpoint in the virtual viewpoint image of the other vehicle to be equivalent to the position of the viewpoint in the virtual viewpoint image of the vehicle.

Based on an adjustment result of the image converter 310, the image aligner 320 may align the virtual viewpoint images and determine an arrangement relationship between the virtual viewpoint images. In a process of aligning the virtual viewpoint images, an overlapping area may be generated, the overlapping area being an overlap of a predetermined area from two or more virtual viewpoint images.

For example, the image aligner 320 may align the virtual viewpoint image of the vehicle and the virtual viewpoint image of the other vehicle based on a location relationship between the vehicle and the other vehicle or a correlation between the virtual viewpoint image of the vehicle and the virtual viewpoint image of the other vehicle. The vehicle may estimate information on an angle and a distance between the vehicle and the other vehicle based on, for example, a beamforming technique. Based on the estimated information, the image aligner 320 may determine the location relationship between the vehicle and the other vehicle. Alternatively, the vehicle may receive global positioning system (GPS) information of the other vehicle from the other vehicle. The image aligner 320 may determine the location relationship between the vehicle and the other vehicle based on the received GPS information of the other vehicle and GPS information of the vehicle. Based on the location relationship, the image aligner 320 may determine an overlapping area corresponding to areas identified as the same area in the virtual viewpoint images and align the virtual viewpoint images based on the overlapping area. When a correlation of a predetermined area between the virtual viewpoint images is verified to be relatively high, a probability that the area is the same area between the virtual viewpoint images may also be high.

In another example, the image aligner 320 may more precisely re-align the virtual viewpoint images based on the correlation between the virtual viewpoint images in addition to the location relationship between the vehicle and the other vehicle after aligning the virtual viewpoint images based on the location relationship.

In still another example, an alignment result of the image aligner 320 may be provided to the image converter 310 as feedback information. In response to the feedback information, the virtual viewpoint images may be re-converted and more precisely re-aligned. For example, the image converter 310 may adjust the position of the viewpoint in the virtual viewpoint image of the other vehicle based on the alignment result output from the image aligner 320. Alternatively, the image converter 310 may adjust the position of the virtual viewpoint in the virtual viewpoint image of the other vehicle to be equivalent to the position of the virtual viewpoint in the virtual viewpoint image of the vehicle such that a whole image has a single unified virtual viewpoint. In comparison to the virtual viewpoint images, each having a different virtual viewpoint, a similarity between the virtual viewpoint images having the overlapping area may increase by additionally converting a plurality of virtual viewpoint images to have a single unified virtual viewpoint. In this example, a correlation of the overlapping area may also increase. Thus, when the image aligner 320 employs the aforementioned approach of applying a value of the correlation of the overlapping area, the arranged virtual viewpoint may be more precisely re-arranged.

When the overlapping area exists in the virtual viewpoint images, the image selector 330 may select which virtual viewpoint image to be use for the overlapping area. For example, the image selector 330 may select a virtual viewpoint image having a higher image resolution from the virtual viewpoint image of the vehicle and the virtual viewpoint image of the other vehicle as the virtual viewpoint image to be applied to the overlapping area. Alternatively, when virtual viewpoint images received from other vehicles are combined, the image selector 330 may determine a virtual viewpoint image received from a vehicle providing a higher quality of communication as the virtual viewpoint image to be applied to the overlapping area. Such a quality of communication may be determined based on, for example, a determined signal-to-noise ratio (SNR) measured for each of the received virtual viewpoint images from each vehicle.

Based on a result of the selecting of which virtual viewpoint image to use for the overlapping area, the image generator 340 may generate an extended virtual viewpoint image by combining the virtual viewpoint images, e.g., except for the portions of the virtual viewpoint images that were not selected for use for the overlapping area. For example, the image generator 340 may combine the virtual viewpoint image of the vehicle with the virtual viewpoint image of the other vehicle and generate the extended virtual viewpoint image based on image information, obstacle information, and traffic signal information, as only examples. The surround viewing system 200 may then provide the extended virtual viewpoint image to the driver through the display 260 of the vehicle.

Figure 4:
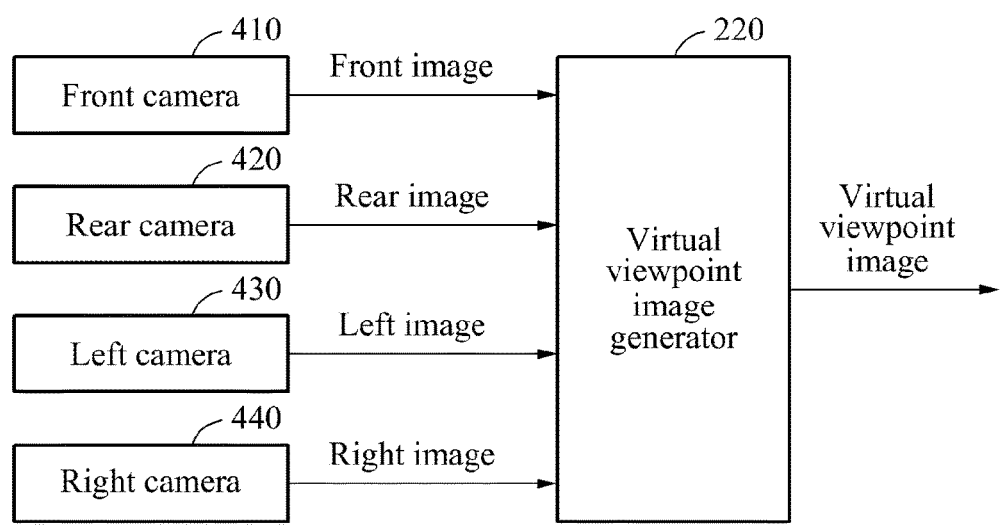
FIG. 4 illustrates a surround viewing system including a virtual viewpoint image generator and multiple cameras, and operation of the surround viewing system, according to one or more embodiments.

FIG. 4 illustrates a surround viewing system including the virtual viewpoint image generator and multiple cameras, and operation of the surround viewing system, according to one or more embodiments.

Referring to FIG. 4, the vehicle may include a front camera 410, a rear camera 420, a left camera 430, and a right camera 440. For example, the front camera 410 may be disposed on a front side of the vehicle and configured and controlled by the surround viewing system to acquire a front image by capturing a surrounding region in front of the vehicle, the rear camera 420 may be disposed on a rear side of the vehicle and configured and controlled by the surround viewing system to acquire a rear image by capturing a surrounding region behind the vehicle, the left camera 430 may be disposed on a left side of the vehicle and configured and controlled by the surround viewing system to acquire a left image by capturing a surrounding region on the left of the vehicle, and the right camera 440 may be disposed on a right side of the vehicle and configured and controlled by the surround viewing system to acquire a right image by capturing a surrounding region on the right of the vehicle.

The virtual viewpoint image generator 220, for example, of the surround viewing system may generate a virtual viewpoint image of the vehicle by combining the front image, the rear image, the left image, and the right image respectively received from the front camera 410, the rear camera 420, the left camera 430, and the right camera 440. Alternatively, additional or less cameras may be used to generate the virtual viewpoint image.

Figure 5:
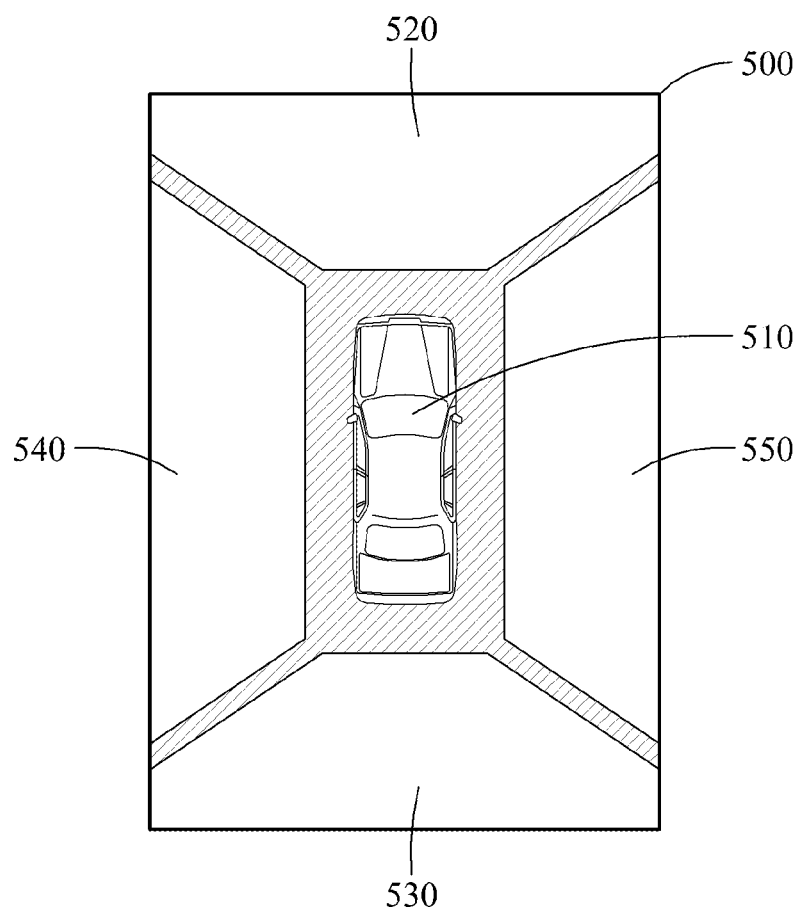
FIGS. 5 and 6 illustrate examples of a virtual viewpoint image, according to one or more embodiments.

FIG. 5 illustrates an example of a virtual viewpoint image of a vehicle generated by a virtual viewpoint image generator, such as by the virtual viewpoint image generator 220 of any of FIGS. 2-4, according to one or more embodiments. A virtual viewpoint image 500 includes a surrounding region of the vehicle viewed from a virtual viewpoint set to be above the vehicle. A pre-stored vehicle image may be used as a vehicle image of the vehicle. A front image may be used to form a first area 520, and a rear image may be used to form a second area 530. A left image may be used to form a third area 540, and a right image may be used to form a fourth area 550. For example, the front image may be an image captured by the front camera 410 of FIG. 4, the rear image may be an image captured by the rear camera 420, the left image may be an image captured by the left camera 430, and the right image may be an image captured by the right camera 440.

Figure 6:
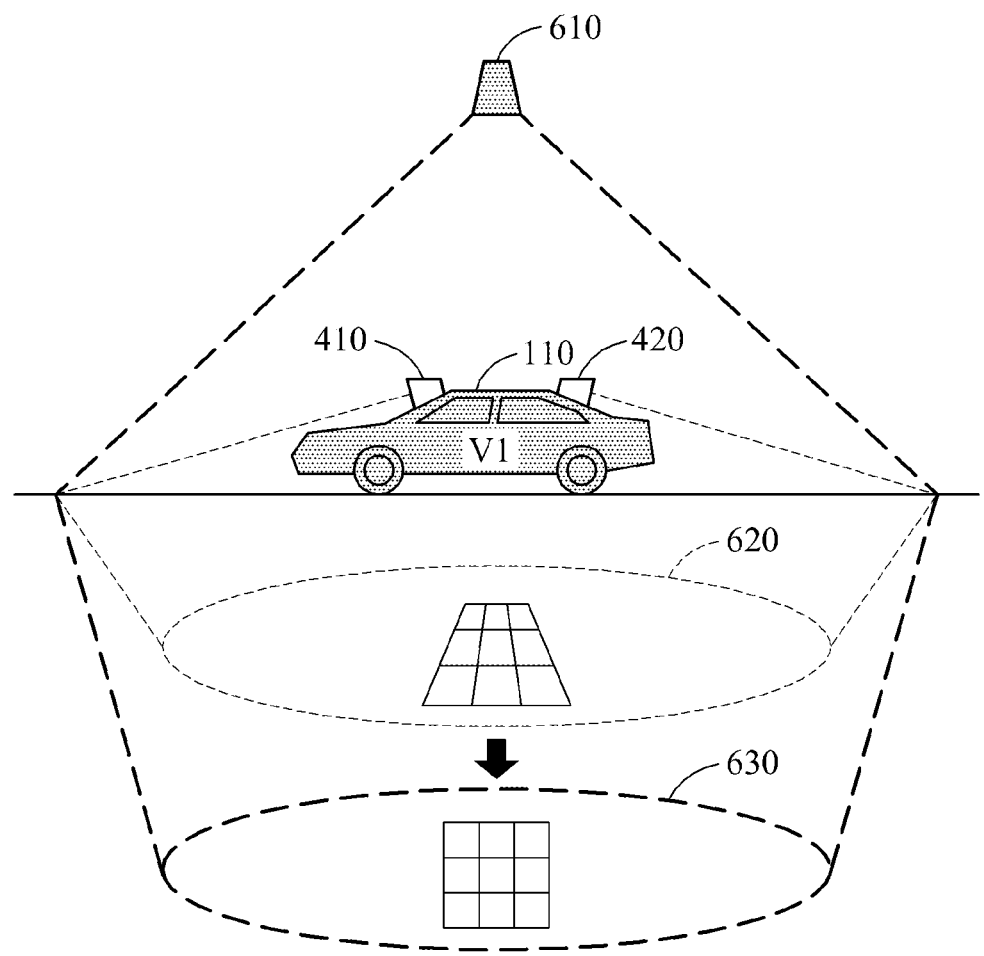

FIG. 6 illustrates an example of a virtual viewpoint image of a vehicle generated by a virtual viewpoint image generator 220, such as the virtual viewpoint image generator 220 of any of FIGS. 2-4. The illustrated vehicle V1 110 may be a surround viewing system, such as any of the surround viewing systems of FIGS. 2-4, and may obtain image information 620 of a surrounding region of the vehicle V1 110 using the example front camera 410 and rear camera 420 included in the vehicle V1 110. As noted, the vehicle V1 110 may be the surround viewing system, or the surround viewing system may be a component or accessory operable with the operations of the vehicle V1 110. The example image information 620 may represent a view having a relatively small elevation angle and thus, may be unsuitable for providing traffic conditions of a wide region to a driver. The virtual viewpoint image generator 220 may convert the image information 620 to a virtual viewpoint image information 630 using the viewpoint 610, which represents a relatively large elevation angle. For example, the virtual viewpoint image generator 220 may increase the elevation angle based on a scheme of reducing respective distances between image pixels verified to be a short distance from the vehicle V1 110 and increasing respective distances between image pixels verified to be a long distance from the vehicle V1 110 in the image information 620.

FIGS. 7A through 9B illustrate respective example image conversion operations, such as performed by the image converter 310 of FIG. 3, according to one or more embodiments. Hereinafter, the vehicle V1 110 may be a vehicle that is used as a point of reference, and the vehicle V2 120 may be another vehicle differing from the vehicle V1 110. Also, as only examples, the surround viewing system 200 may be vehicle V1 110, or may be included, or available for inclusion, in the vehicle V1 110 as a component or accessory configured to be operable with, or independent from, the operations of the vehicle V1 110.

Figure 7A:
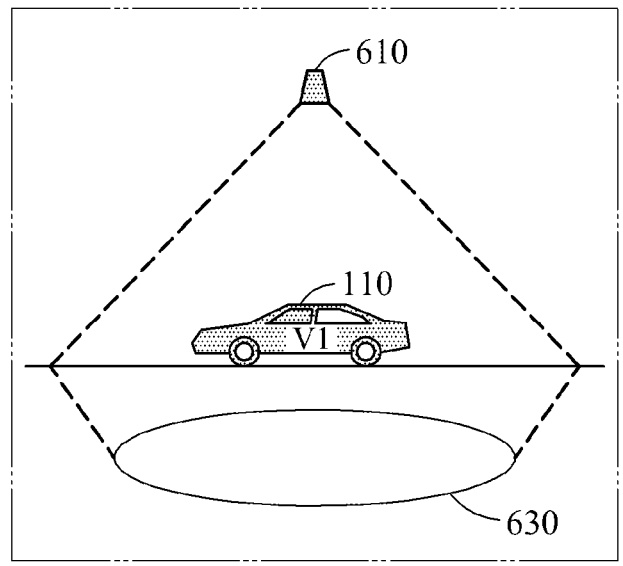
FIGS. 7A through 9B illustrate respective example image conversion operations, according to one or more embodiments.
Figure 7B:
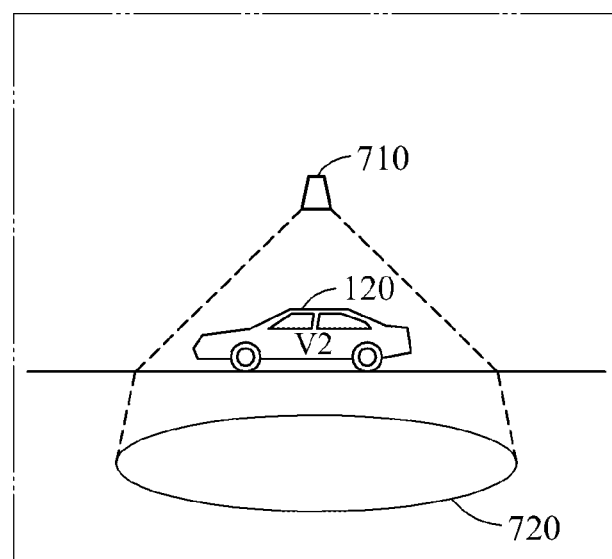

As illustrated in FIGS. 7A and 7B, an image of the virtual viewpoint image information 630 with respect to the vehicle V1 110 may be similar in size to a virtual viewpoint image 720 of the vehicle V2 120. However, due to a determined difference in height between viewpoints or a determined difference in speed between the vehicle V1 110 and the vehicle V2 120, actual scales of the image of the virtual viewpoint image information 630 and the virtual viewpoint image 720 may differ from one another. Thus, it may be desirable to match the image of the virtual viewpoint image information 720 to the virtual viewpoint image 630 when an extended virtual viewpoint image is generated for the vehicle V1 110, by combining the image of the virtual viewpoint image information 630 and the virtual viewpoint image 720. To this end, the image converter 310 may adjust image sizes and positions of the viewpoints.

Figure 8A:
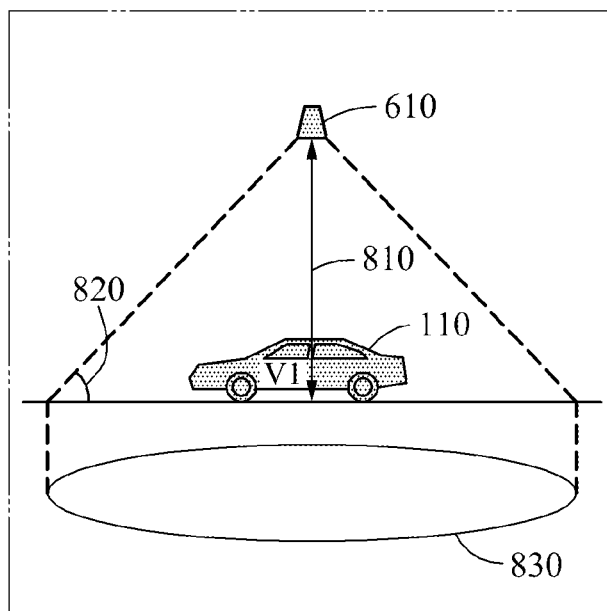
Figure 8B:
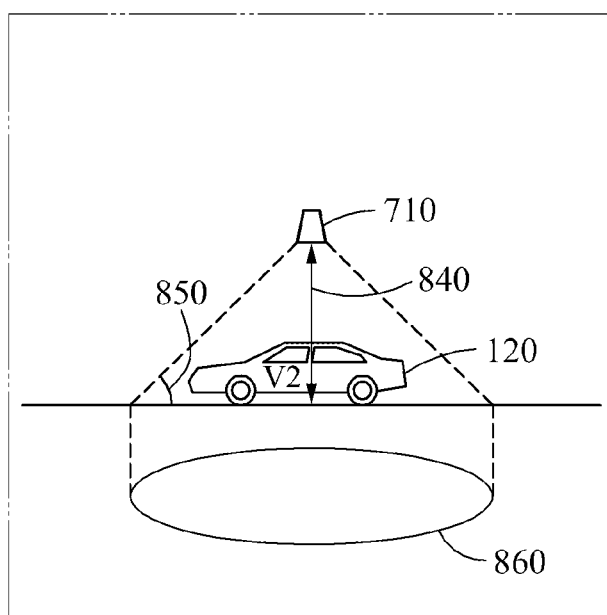

FIGS. 8A and 8B respectively illustrate a virtual viewpoint image 830 acquired by adjusting a size of the image in the virtual viewpoint image information 630 and a virtual viewpoint image 860 acquired by adjusting a size of the virtual viewpoint image 720. The image converter 310 may generate the virtual viewpoint image 830 by adjusting the size of the image in the virtual viewpoint image 630 based on a height 810 or an elevation angle 820 of the viewpoint 610 included in the virtual viewpoint image information 630. Similarly, the image converter 310 may generate the virtual viewpoint image 860 by adjusting the size of the virtual viewpoint image 720 with respect to the vehicle V2 120 based on a height 840 or an elevation angle 850 of the viewpoint 710 of the virtual viewpoint image 720. In this example, view angles of the viewpoint 610 and the viewpoint 710 may be used in lieu of the elevation angle 820 and the elevation angle 850.

In an example, the receiver 240 included in the vehicle V1 110 may receive information on the actual scale of the virtual viewpoint image 720 from the vehicle V2 120, which may indicate the scope or extent of surrounding information that may now be additionally available to the vehicle V1 110 based on the information provided by the vehicle V2 120. Based on the received information, the image converter 310 may adjust the respective sizes of the image of the virtual viewpoint image 630 and the virtual viewpoint image 720 such that the actual scale included in the virtual viewpoint image information 630 is to be equivalent to the actual scale of the virtual viewpoint image 720, for example.

When a determined difference in height between the viewpoint 610 and the viewpoint 710 is determined to be relatively large, an image generated by simply combining the image of the virtual viewpoint image information 630 and the virtual viewpoint image 720 may appear unnatural due to the difference. Thus, it may be desirable to match the height 810 of the viewpoint 610 to the height 840 of the viewpoint 710 before the image of the virtual viewpoint image information 630 is combined with the virtual viewpoint image 720. The image converter 310 may adjust the heights of the viewpoint 610 and the viewpoint 720 after adjusting the sizes of the image of the virtual viewpoint image information 630 and the virtual viewpoint image 720. In an example, the image converter 310 may adjust the height 840 of the viewpoint 710 in the virtual viewpoint image 860 to be equivalent to the height 810 of the viewpoint 610 in the virtual viewpoint image 830.

Figure 9A:
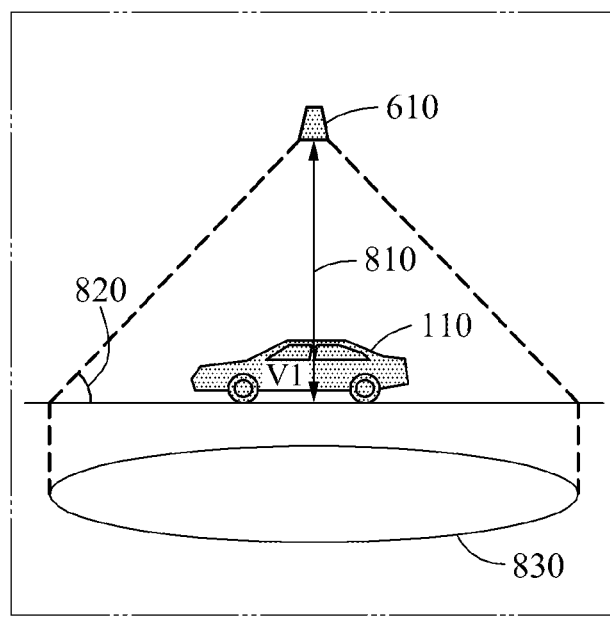
Figure 9B:
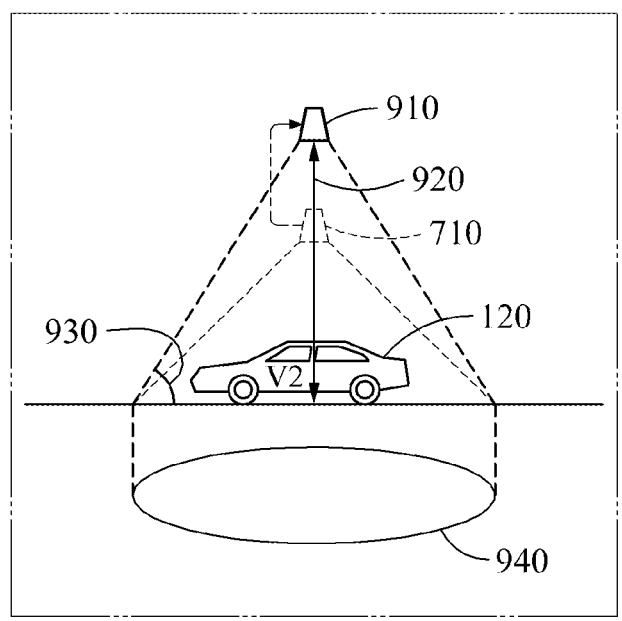

FIGS. 9A and 9B illustrate a virtual viewpoint image 940 acquired by adjusting a height of a viewpoint included in the virtual viewpoint image 860 based on the height 810 of the viewpoint 610 included in the virtual viewpoint image 830. For example, the image converter 310 may adjust the viewpoint 710 to be a viewpoint 910 having a height 920 by adjusting the elevation angle 850 of the virtual viewpoint image 860 to be an elevation angle 920. In this example, the height 920 may be equivalent to the height 810 of the viewpoint 610 included in the virtual viewpoint image 830.

In an embodiment, when additional vehicles are providing information, the adjusted sizes of the images and heights of the differing viewpoints may be based on a consideration of the entire extended scope or range of the surrounding road that may now be available from the differing sources, so that sizes of the images and heights of the viewpoints may be matched to a derived image size and viewpoint height that is based on that consideration.

Figure 10:
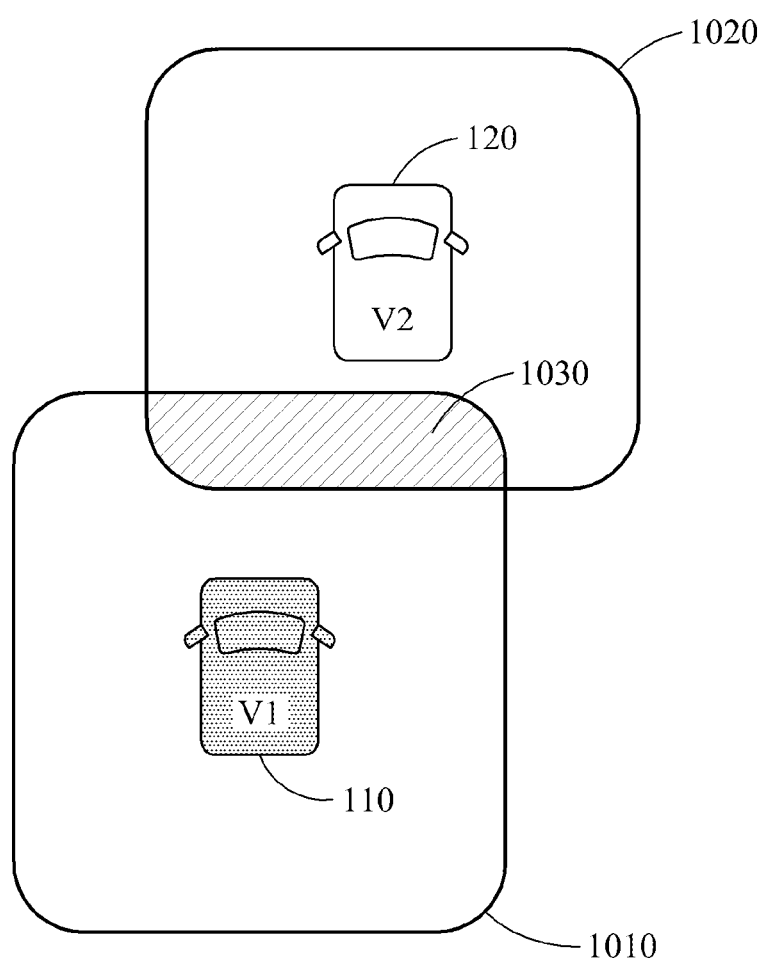
FIGS. 10 and 11 illustrate respective image aligning operations, according to one or more embodiments.
Figure 11:
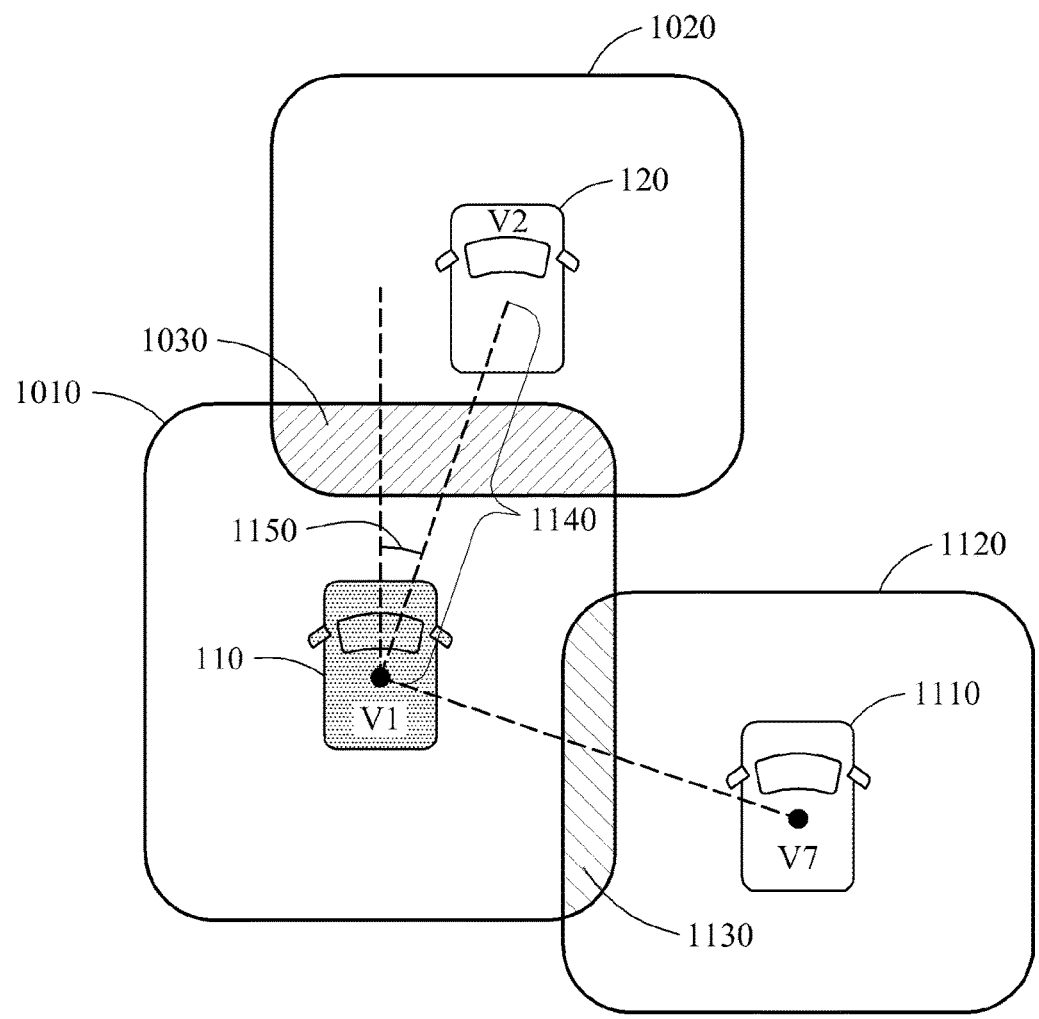

FIGS. 10 and 11 illustrate respective image aligning operations, e.g., such as performed by the image aligner 320 of FIG. 3, according to one or more embodiments.

The image aligner 320 may align virtual viewpoint images output from the image converter 310 by determining an arrangement relationship between the virtual viewpoint images. FIG. 10 illustrates an arrangement relationship between a virtual viewpoint image 1010 of the vehicle V1 110 and a virtual viewpoint image 1020 of the vehicle V2 120. The image aligner 320 may determine the arrangement relationship between the virtual viewpoint image 1010 and the virtual viewpoint image 1020 based on information on an angle and a distance between the vehicle V1 110 and the vehicle V2 120 or location information of the vehicle V1 110 and the vehicle V2 120, for example. Alternatively, the image aligner 320 may determine the arrangement relationship between the virtual viewpoint image 1010 and the virtual viewpoint image 1020 based on a correlation between the virtual viewpoint image 1010 and the virtual viewpoint image 1020. The image aligner 320 may align the virtual viewpoint image 1010 and the virtual viewpoint image 1020 by overlapping areas determined as having a high correlation in the virtual viewpoint image 1010 and the virtual viewpoint image 1020.

As a result of the aligning the virtual viewpoint image 1010 and the virtual viewpoint image 1020, an overlapping area 1030 between the virtual viewpoint image 1010 and the virtual viewpoint image 1020 may be determined. As only an example, at least one of an image size of the virtual viewpoint image 1010, an image size of the virtual viewpoint image 1020, a position of a viewpoint of the virtual viewpoint image 1010, and a position of a viewpoint of the virtual viewpoint image 1020 may be adjusted by the image converter 310. The overlapping area 1030 may indicate areas in the virtual viewpoint image 1010 and the virtual viewpoint image 1020 verified as a result obtained by viewing the same region.

FIG. 11 illustrates an example of the image aligner 320 aligning the virtual viewpoint image 1010 of the vehicle V1 110, the virtual viewpoint image 1020 of the vehicle V2 120, and a virtual viewpoint image 1120 of a vehicle V7 1110. In an example, the image aligner 320 may determine an arrangement relationship between the virtual viewpoint image 1010 and the virtual viewpoint image 1020 based on information on a distance 1140 between the vehicle V1 110 and the vehicle V2 120 and information on an angle 1150 between the vehicle V1 110 and the vehicle V2 120. As an example, the vehicle V1 110 may estimate the distance 1140 between the vehicle V1 110 and the vehicle V2 120 and a direction in which the vehicle V2 120 is located using, for example, a sensor and a multiple antenna device. Based on a result of the estimating, the vehicle V1 110 may determine the arrangement relationship between the virtual viewpoint image 1010 and the virtual viewpoint image 1020. When an obstacle exists between the vehicle V1 110 and the vehicle V7 1110, for example, information on an angle and a distance between the vehicle V1 110 and the vehicle V7 1110 may not be estimated. In this example, the image aligner 320 may determine the arrangement relationship between the virtual viewpoint image 1010 and the virtual viewpoint image 1120 based on location information of the vehicle V1 110 and location information of the vehicle V7 1110. Here, the virtual viewpoint image 1120 may be a virtual viewpoint image of which at least one of an image size and a position of a viewpoint is adjusted by the image converter 310. As another example, the image aligner 320 may determine the arrangement relationship among the virtual viewpoint image 1010, the virtual viewpoint image 1020, and the virtual viewpoint image 1120 by determining correlations among the virtual viewpoint image 1010, the virtual viewpoint image 1020, and the virtual viewpoint image 1120, and by aligning the virtual viewpoint image 1010, the virtual viewpoint image 1020, and the virtual viewpoint image 1120 such that areas corresponding to determined high correlations overlap.

In an example, the image aligner 320 may arrange the virtual viewpoint image 1010, the virtual viewpoint image 1020, and the virtual viewpoint image 1120 based on a determined location relationship among the vehicle V1 110, the vehicle V2 120, and the vehicle V7 1170 and then may more precisely re-arrange the virtual viewpoint image 1010, the virtual viewpoint image 1020, and the virtual viewpoint image 1120 based on the determined correlations among the virtual viewpoint image 1010, the virtual viewpoint image 1020, and the virtual viewpoint image 1120.

As a result of the aligning, the overlapping area 1030 between the virtual viewpoint image 1010 and the virtual viewpoint image 1020, and an overlapping area 1130 between the virtual viewpoint image 1010 and the virtual viewpoint image 1120 may be determined. Alternatively, areas of which the correlations among the virtual viewpoint image 1010, the virtual viewpoint image 1020, and the virtual viewpoint image 1120 satisfy a preset reference correlation may be determined to be the overlapping area 1030 and the overlapping area 1130.

Figure 12:
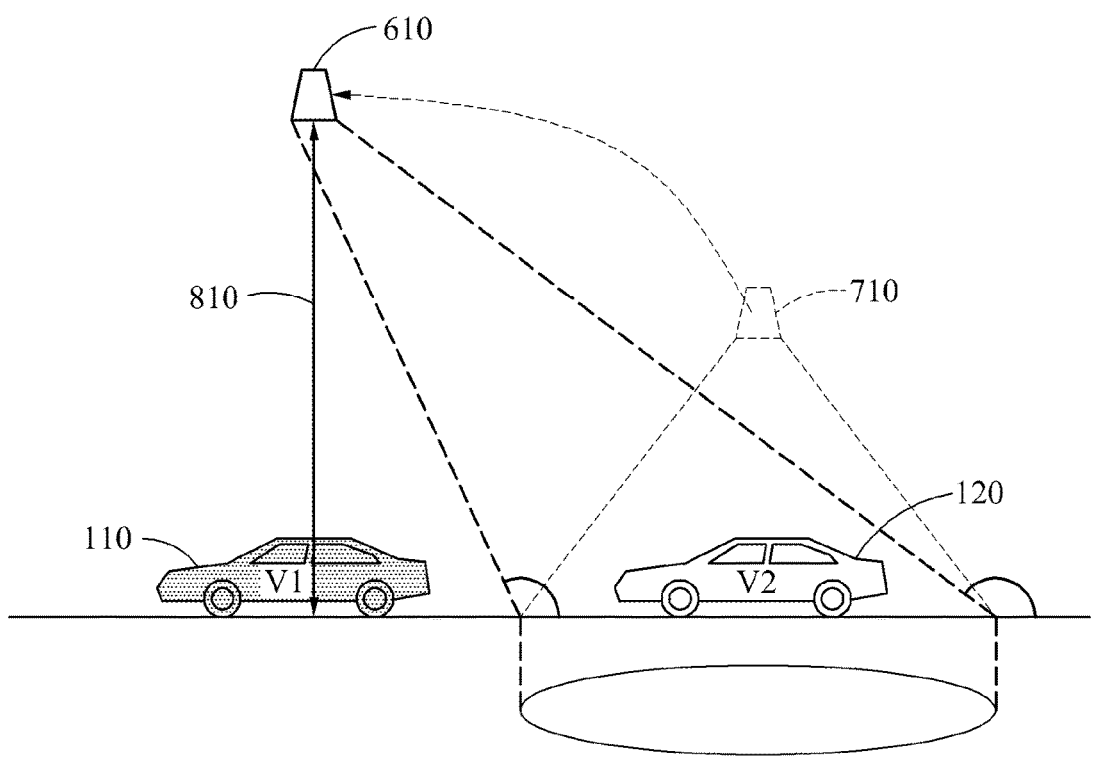
FIG. 12 illustrates a feedback operation that may be performed between an image converter and an image aligner, according to one or more embodiments.

FIG. 12 illustrates a feedback operation that may be performed between an image converter and image aligner, such as the image converter 310 and the image aligner 320 of FIG. 3, according to one or more embodiments.

Depending on embodiment, a whole image generated by combining a plurality of virtual viewpoint images may need to be constructed to have a single unified virtual viewpoint in lieu of a plurality of viewpoints so as to be appear natural to the driver. To this end, an alignment result of the image aligner 320 may be provided to the image converter 310 as feedback information. For example, the image aligner 320 may align a virtual viewpoint image of the vehicle V1 110 and a virtual viewpoint image of the vehicle V2 120 and then the virtual viewpoint image of the vehicle V2 120 may be input to the image converter 310.

The image converter 310 may adjust a viewpoint of the feedback virtual viewpoint image of the vehicle V2 120 to be at a position of a viewpoint of the virtual viewpoint image with respect to the vehicle V1 110. Through this, the whole image may have the single unified virtual viewpoint such that an extended virtual viewpoint image may appear more natural. In addition, through a provision of such feedback, the virtual viewpoint images may be more precisely aligned. For example, when the virtual viewpoint images are converted to have the single unified virtual viewpoint, correlations corresponding to an overlapping area of the virtual viewpoint images may increase and thus, the image aligner 320 may more precisely re-arrange the virtual viewpoint images based on information on the correlation.

Figure 13:
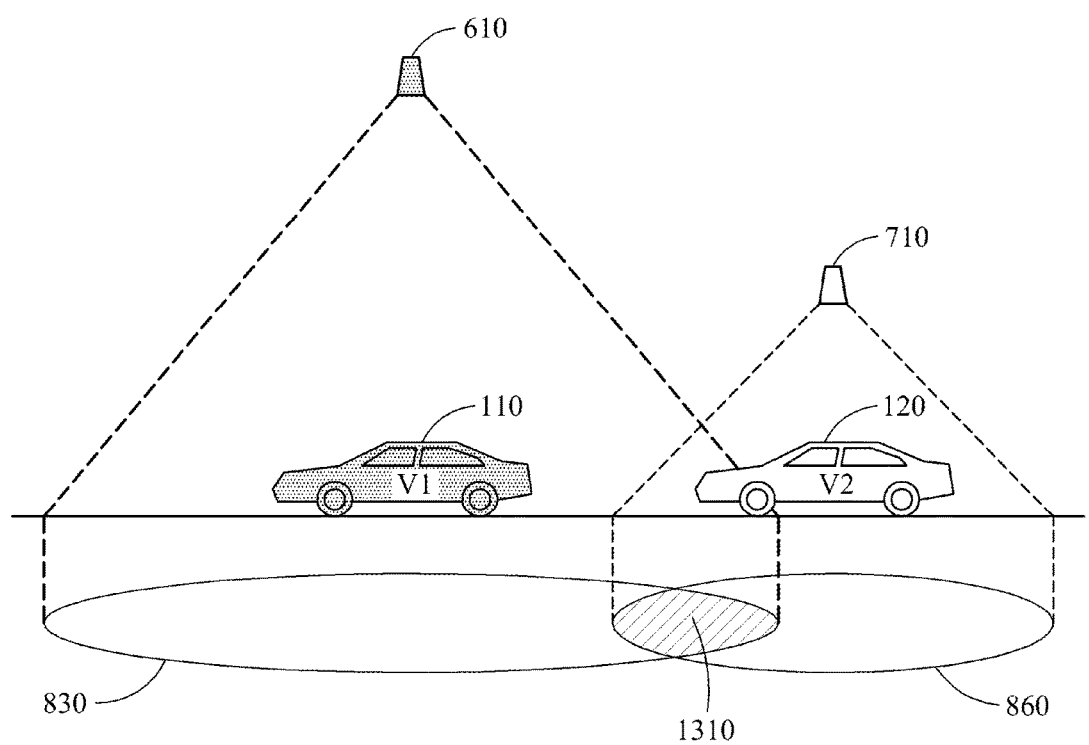
FIGS. 13 through 15 illustrate example aligned image results, according to one or more embodiments.
Figure 14:
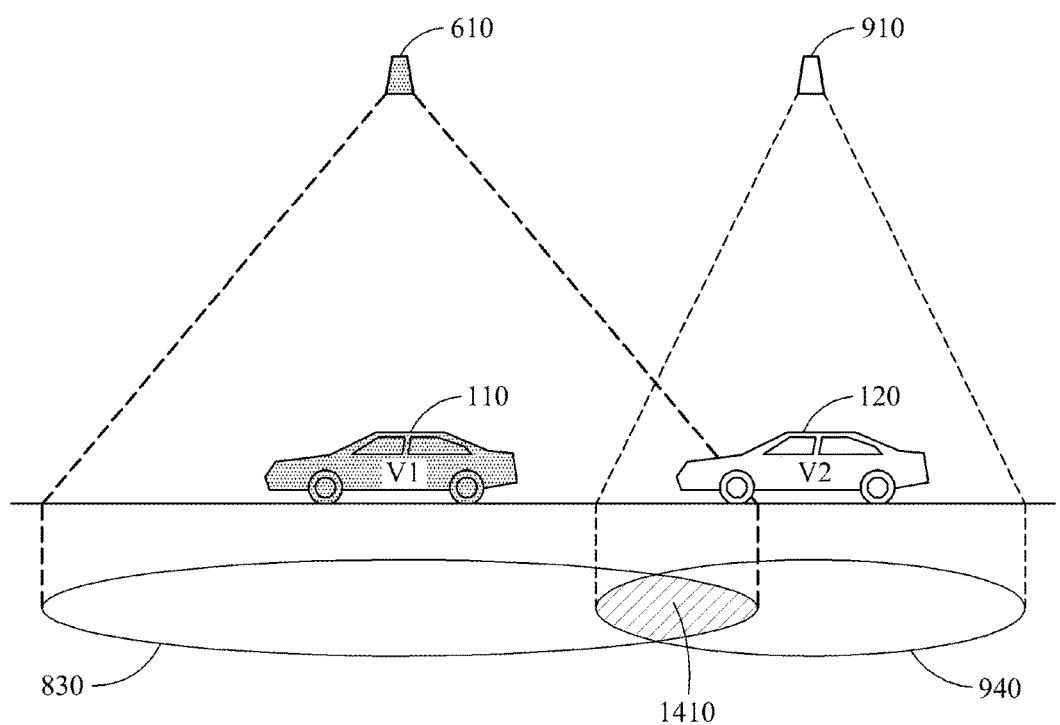
Figure 15:
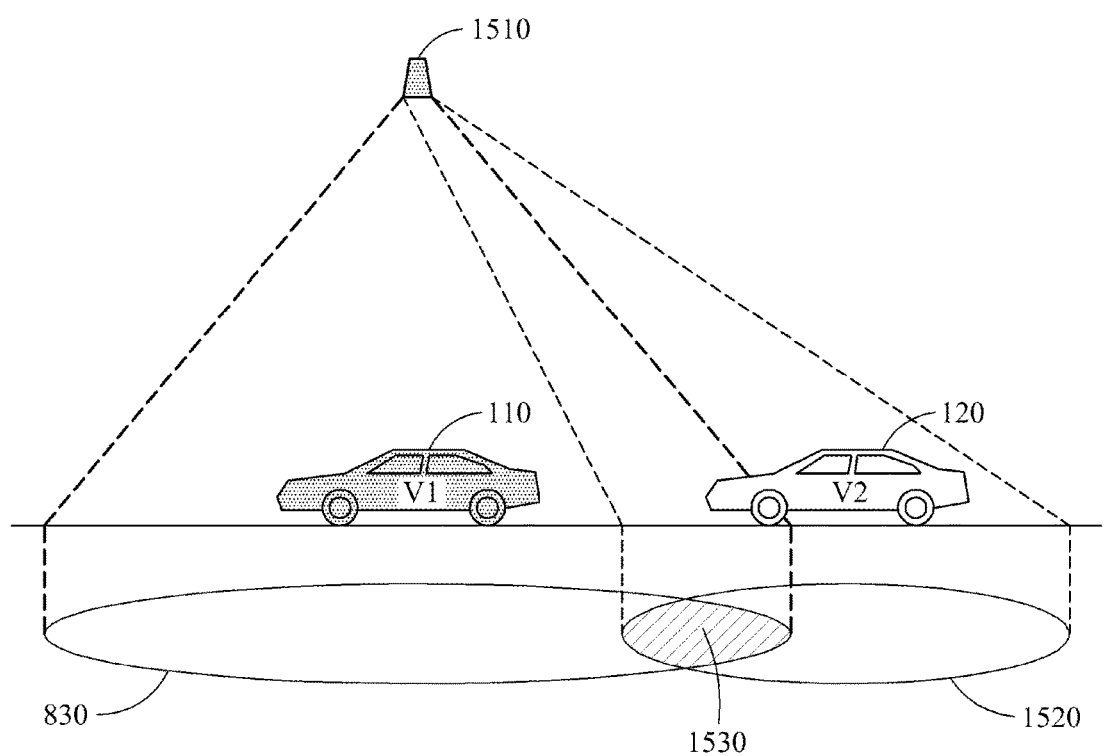

FIGS. 13 through 15 illustrate example aligned image results, such as provided by the image aligner 320 of FIG. 3, according to one or more embodiments.

FIG. 13 illustrates the result of an aligning of the virtual viewpoint image 830 of the vehicle V1 110 and the virtual viewpoint image 860 of the vehicle V2 120. In this example, the virtual viewpoint image 830 and the virtual viewpoint image 860 may be have an adjusted size. A position of the virtual viewpoint 610 of the virtual viewpoint image 830 may differ from a position of the virtual viewpoint 710 of the virtual viewpoint image 860. The overlapping area 1310 may be included in the virtual viewpoint image 830 and the virtual viewpoint image 860.

In contrast to the example of FIG. 13, FIG. 14 illustrates the result of an additional adjusting of a height of the virtual viewpoint 910 of the virtual viewpoint image 860 to be equivalent to a height of the virtual viewpoint 610 of the virtual viewpoint image 830. An overlapping area 1410 may be included in the virtual viewpoint image 830 and the virtual viewpoint image 940 having the adjusted height of the virtual viewpoint 910.

Examples of FIGS. 13 and 14 are provided under an assumption that the plurality of virtual viewpoints are distributed in an extended virtual viewpoint image. In contrast, FIG. 15 illustrates a result obtained by providing the alignment result of the image aligner 320 to the image converter 310 as feedback, such that the resultant image based on the feedback has a single unified virtual viewpoint 1510. The virtual viewpoint image 830 of the vehicle V1 110 and a virtual viewpoint image 1520 of the vehicle V2 120 may now have the single unified virtual viewpoint 1510. The virtual viewpoint image 830 and the virtual viewpoint image 1520 may include an overlapping area 1530.

Figure 16:
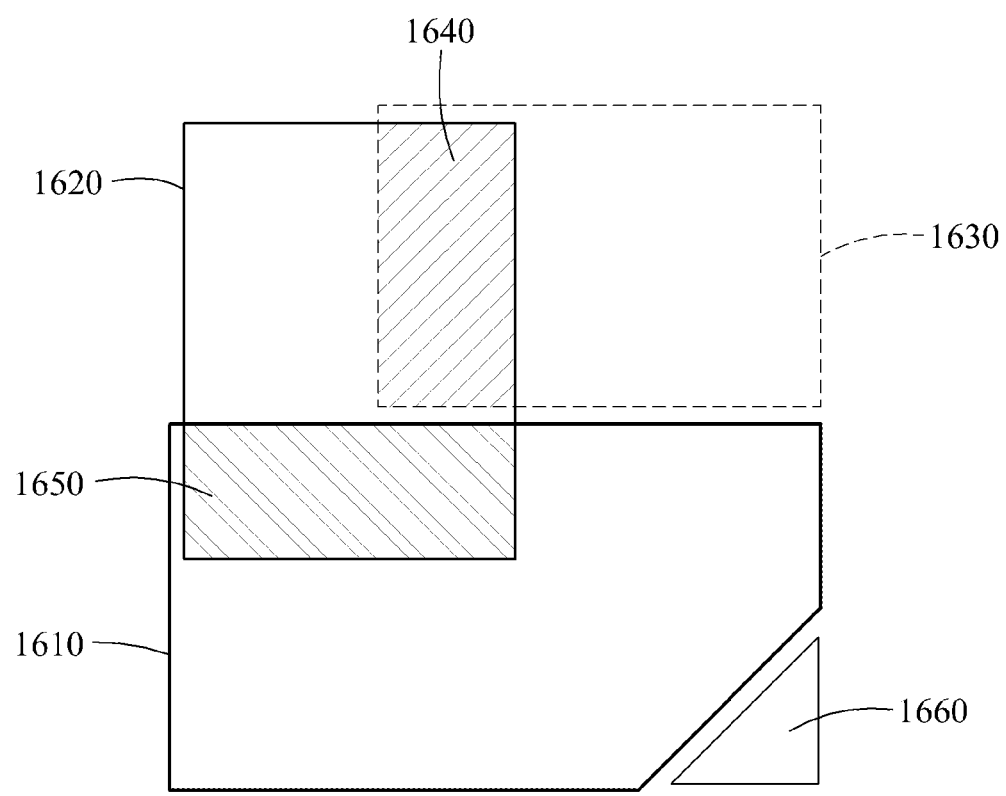
FIG. 16 illustrates an image selector method, according to one or more embodiments.

FIG. 16 illustrates an image selector method, such as performed by the image selector 330, according to one or more embodiments. In this example, it may be assumed that a virtual viewpoint image 1610 of the vehicle V1 110, a virtual viewpoint image 1620 of the vehicle V2 120, and a virtual viewpoint image 1630 of the vehicle V7 1110 have been aligned. The virtual viewpoint image 1610 and the virtual viewpoint image 1620 may include an overlapping area 1650, and the virtual viewpoint image 1620 and the virtual viewpoint image 1630 may include an overlapping area 1640. The area 1660 may include or represent an unidentifiable region in an eventual whole image of the resultant extended virtual viewpoint image.

The image selector 330 may select one of the virtual viewpoint images to use for the overlapping area 1650, i.e., from among the virtual viewpoint image 1610 and the virtual viewpoint image 1620. The image selector 330 may also select one of the virtual viewpoint images to use for the overlapping area 1640, i.e., from among the virtual viewpoint image 1620 and the virtual viewpoint image 1630. The image selector 330 may respectively select the virtual viewpoint images to use for the overlapping area 1640 and the overlapping area 1650 based on determined respective image resolutions of the virtual viewpoint images or determined quality of the respective communications that provided the vehicle V1 110 the virtual viewpoint images. For example, when an image resolution of the virtual viewpoint image 1610 is higher than an image resolution of the virtual viewpoint image 1620, the image selector 330 may choose to use image information of the virtual viewpoint image 1610 to generate the overlapping area 1650 in the resultant extended virtual viewpoint image.

Additionally, the image selector 330 may determine which virtual viewpoint image to use for the overlapping area 1650 based on determined respective signal to noise ratios (SNR's) of the respective communications that provided the vehicle V1 110 the virtual viewpoint images. As an example, potentially with the least amount of added noise, the SNR for the virtual viewpoint image from the vehicle V1 110 may have a maximum value, or represent a maximum reference value. In this example, image information of the virtual viewpoint image 1610 having a greater SNR may be used to generate the overlapping area 1650 in the resultant extended virtual viewpoint image. Similarly, a determined SNR of the virtual viewpoint image from the vehicle V2 120, e.g., measured by the receiver 240 of the vehicle V1 110, may be greater than the determined SNR of the virtual viewpoint image from the vehicle V7. In this example, the image selector 330 may use image information from the virtual viewpoint image 1620 to generate the overlapping area 1640 in the resultant extended virtual viewpoint image. In an embodiment, when the determined SNRs for different virtual viewpoint images are similar, image resolutions of the virtual viewpoint images may also be compared and image information of the virtual viewpoint image having the higher image resolution may be used to generate an overlapping area in the resultant extended virtual viewpoint image.

Figure 17:
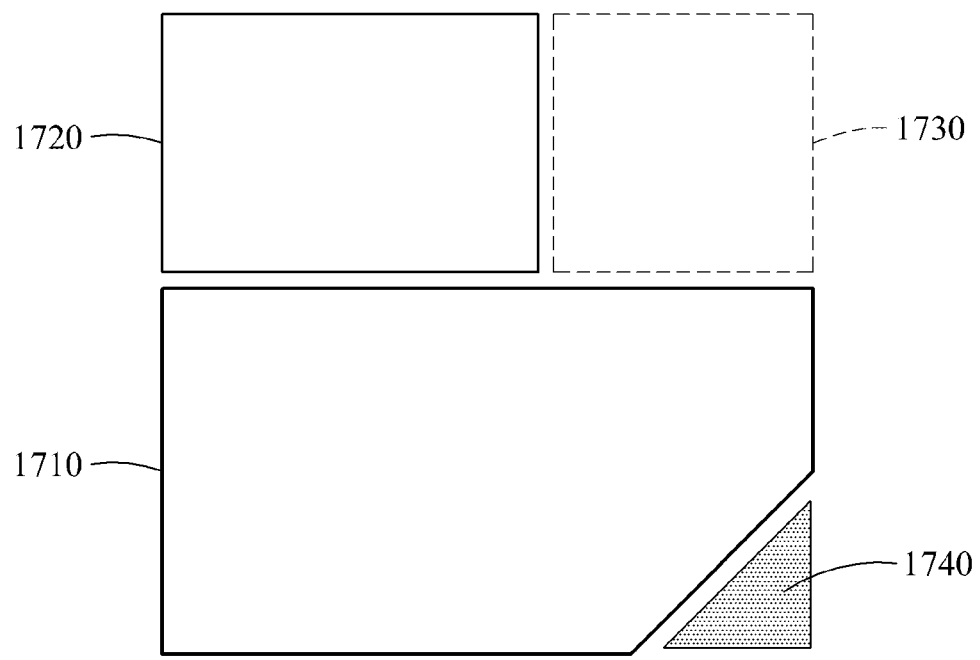
FIGS. 17 and 18 illustrate image generation operations, according to one or more embodiments.
Figure 18:
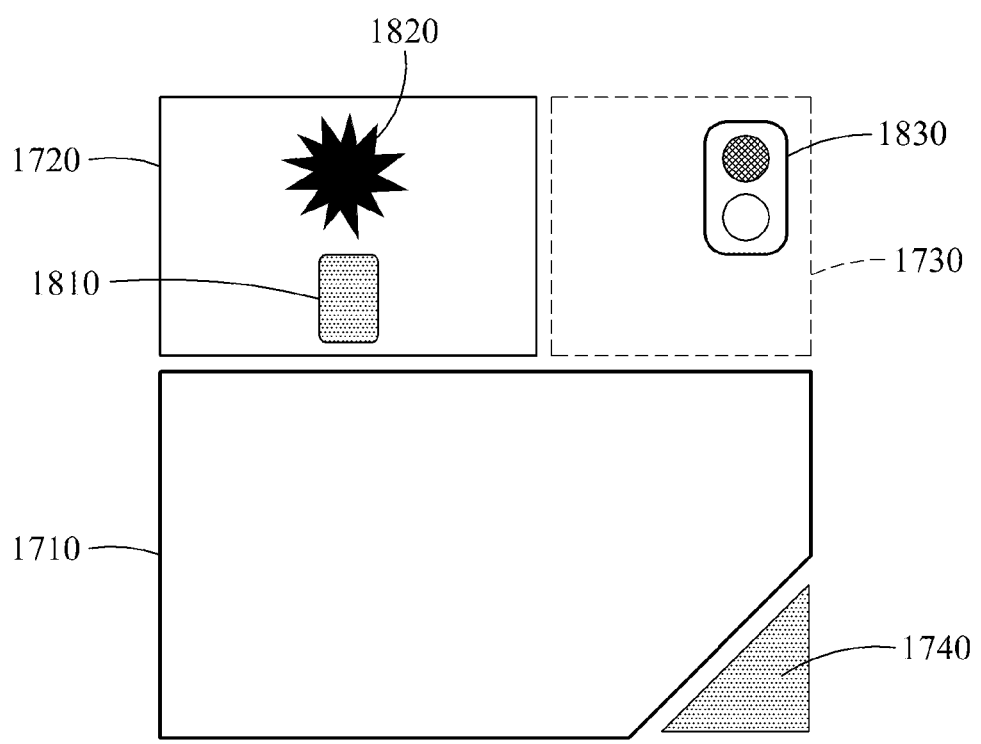

FIGS. 17 and 18 illustrate image generation operations, such as performed by the image generator 340 of FIG. 3, according to one or more embodiments.

The image generator 340 may combine the different virtual viewpoint images based on a selection result of the image selector 330, and generate a whole image of the extended virtual viewpoint image using the selected portions of the different viewpoint images, such as described above with regard to FIG. 16. For example, the extended virtual viewpoint image may include virtual viewpoint image information 1710 of the vehicle V1 110, virtual viewpoint image information 1720 of the vehicle V2 120, and virtual viewpoint image information 1730 of the vehicle V7 1110. Image information of an area 1740 may not be provided. In this case, the area 1740 may be expressed using a predetermined color, or special effects, such as a twinkling effect that may be applied to the area 1740, to indicate that such image information of the area 1740 is not available.

FIG. 18 illustrates an extended virtual viewpoint image generation based on a combination of virtual viewpoint images, with the extended virtual viewpoint image being output with obstacle and and/or traffic information. An image 1810, e.g., acquired by viewing a predetermined vehicle from above, may be indicated using an actual vehicle image or a virtual vehicle image, or indicated using a predetermined color. As indicated in an area 1820, the obstacle information may be provided by applying a special effect, for example, a twinkling effect, or by using a predetermined color. Also, the traffic information including, for example, a speed limit, a current traffic signal, a vehicle travelling at a high speed, and an arrangement of monitoring cameras may be simultaneously output to the extended virtual viewpoint image, such as shown by area 1830 including traffic signal information displayed on the extended virtual viewpoint image. The traffic signal information of the area 1830 may allow a driver to predict a traffic flow and provide the driver with an increased convenience for driving.

FIG. 19 illustrates a surround viewing method, according to one or more embodiments. The surround viewing method may be performed by a surround viewing system, such as any of the surround viewing systems 200 of FIGS. 2-4, as only examples, and may be performed as an operation of a vehicle or as an operation independent of other operations of such a vehicle. The surround viewing method and system are also not limited to use as or in vehicles, and are available for other applications. Briefly, below operations of the surround viewing method will be discussed with reference to the example surround viewing system for convenience of explanation, but embodiments are not limited thereto, as alternate apparatuses or systems may implement the same.

In operation 1910, the surround viewing system may generate a virtual viewpoint image of a vehicle based on a surrounding view acquired by capturing a surrounding region of the vehicle. For example, the surround viewing system may generate the virtual viewpoint image by reducing respective distances between pixels corresponding to a short-range region of a captured surrounding image with respect to the location of the vehicle and increasing respective distances between pixels corresponding to a long-range region of the captured surrounding image with respect to the location of the vehicle.

In operation 1920, the surround viewing system may selectively transmit at least one of additional information and the generated virtual viewpoint image of the vehicle to one or more other vehicles and/or one or more RSE's. The additional information may include any one or more of ID information of the vehicle, speed information of the vehicle, height information of a viewpoint of the virtual viewpoint image of the vehicle, angle information of the viewpoint of the virtual viewpoint image of the vehicle, resolution information of the virtual viewpoint image of the vehicle, scale information computed by the vehicle, location information of the vehicle, a vehicle image of the vehicle viewed downward from above, and/or traffic information obtained or sensed by the vehicle, as non-limiting examples.

In an embodiment, before transmitting the generated virtual viewpoint image, the surround viewing system may adjust a position of the viewpoint in the virtual viewpoint image of the vehicle based on a determined or notified location of another vehicle and then, transmit the adjusted virtual viewpoint image to the other vehicle. Alternatively, if the generated virtual viewpoint image is transmitted without such adjustments any of the receiving vehicles may then selectively perform such adjustments by their respective surround viewing systems, as deemed necessary or desirable for their respective extended virtual viewpoint image generations.

In operation 1930, the surround viewing system may receive at least one of such additional information and virtual viewpoint images, of the one or more other vehicles, respectively from the one or more other vehicles. Here, the additional information that is being received from the other vehicles may include any one or more of respective ID information of the corresponding other vehicle, speed information of the corresponding other vehicle, height information of a viewpoint in the virtual viewpoint image of the corresponding other vehicle, angle information of the viewpoint in the virtual viewpoint image of the corresponding other vehicle, resolution information of the virtual viewpoint image of the corresponding other vehicle, scale information computed by the corresponding other vehicle, location information of the corresponding other vehicle, a vehicle image of the corresponding other vehicle viewed downward from above, and traffic information obtained by the corresponding other vehicle, as non-limiting examples.

In operation 1940, the surround viewing system may selectively receive from one or more RSE's at least one of respective additional information and one or more surrounding views, e.g., viewed by a corresponding RSE. The additional information may include any one or more of speed information of vehicles included in a region viewed by the RSE, height information of a viewpoint of the surrounding view captured by the RSE, location information of the RSE, scale information computed by the RSE, and traffic information obtained by the RSE, as non-limiting examples. In an embodiment where the RSE also includes a surround viewing system and generates a virtual viewpoint image, the RSE may also, or alternatively, transmit such a generated virtual viewpoint image.

In operation 1950, the surround viewing system may generate an extended virtual viewpoint image by combining the virtual viewpoint image of the vehicle and one or more received virtual viewpoint images of the other vehicles. The surround viewing system may generate an extended virtual viewpoint image by aligning and combining the different virtual viewpoint images, e.g., after adjusting image sizes and the positions of the respective viewpoints of the virtual viewpoint images. Example available embodiment descriptions related to operation 1950 have already been provided above with reference to FIG. 10, for example, and accordingly are not repeated here.

In operation 1940, when the RSE surrounding view, provided by the RSE, is received by the vehicle, the generation of the extended virtual viewpoint image may include the surround viewing system generating the extended virtual viewpoint image by combining the virtual viewpoint image of the vehicle, the received virtual viewpoint image of another vehicle, and the received RSE surrounding view, for example.

In operation 1960, the surround viewing system may output the extended virtual viewpoint image, which may include displaying the extended virtual viewpoint image on a display. The display may be a component of the surround viewing system or separate from the surround viewing system. The displayed extended virtual viewpoint image may provide the driver with extended surrounding image information as well as related traffic information, simultaneously.

In the foregoing, although descriptions about the surround viewing method of providing a surrounding view of a vehicle are provided in order from operations 1910 through 1960 as an example, an order of implementing the method is not limited to the order of FIG. 19 and thus, an order of performing operations 1920 through 1960 may be varied. For example, operation 1910 may be performed subsequently to operation 1930 or operation 1940, and operation 1930 may be performed in advance of operation 1910 or operation 1920. Also, operation 1940 may be performed in advance of operation 1910, operation 1920, or operation 1930, with alternate operation sequencing also being available.

FIG. 20 illustrates a surround viewing method, according to one or more embodiments. The surround viewing method may be performed by a surround viewing system, such as any of the surround viewing systems 200 of FIGS. 2-4, as only examples, and may be performed as an operation of a vehicle or as an operation independent of other operations of such a vehicle. The surround viewing method and system are also not limited to use as or in vehicles, and are available for other applications. Briefly, below operations of the surround viewing method will be discussed with reference to the example surround viewing system for convenience of explanation, but embodiments are not limited thereto, as alternate apparatuses or systems may implement the same In operation 2010, the surround viewing system may perform a conversion on at least one of a virtual viewpoint image of a vehicle and a received virtual viewpoint image of another vehicle. For example, the surround viewing system may adjust positions of viewpoints in the virtual viewpoint images and/or adjusts image sizes of the virtual viewpoint images such that the same scale is applied to all of the virtual viewpoint images, for example.

In operation 2020, the surround viewing system may align the virtual viewpoint image of the vehicle and the received virtual viewpoint image of the other vehicle. The surround viewing system may determine an arrangement relationship between the virtual viewpoint images based on a determined location relationship between the vehicle and the other vehicle or based on a determined correlation between the virtual viewpoint images. As a result of the aligning of the virtual viewpoint images, overlapping areas between the virtual viewpoint images may be determined.

In operation 2030, the surround viewing system may select which one of the virtual viewpoint images, from among the virtual viewpoint image of the vehicle and the virtual viewpoint image of the other vehicle, to use to generate the overlapping area in the extended virtual viewpoint image, for example. The surround viewing system may select between the virtual viewpoint images based on which virtual viewpoint image has the higher image resolution for the overlapping area, or based on which transmission of the received virtual viewpoint image signals has the greater SNR for the overlapping area.

In operation 2040, the surround viewing system may generate the extended virtual viewpoint image by combining the virtual viewpoint image of the vehicle and the virtual viewpoint image of the other vehicle based on the results of operation 2030. The extended virtual viewpoint image may be constructed based on a location of the vehicle, and also be constructed to represent traffic information simultaneously with image information of an extended region surrounding the vehicle.

In addition, apparatuses, units, modules, devices, and other components illustrated in FIGS. 1A-4 and 6, for example, that may perform one or more operations described herein with respect to FIGS. 1A-20, for example, are implemented by hardware components. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, controllers, sensors, memory, drivers, processing devices, and any other electronic components known to one of ordinary skill in the art. In one example, the hardware components are implemented by one or more processing devices, or processors, or computers. A processing device, processor, or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processing device, processor, or computer includes, or is connected to, one or more memories storing computer readable code, instructions, or software that are executed by the processing device, processor, or computer and that may control the processing device, processor, or computer to implement one or more methods described herein. Hardware components implemented by a processing device, processor, or computer execute code, instructions, or software, such as an operating system (OS) and one or more software applications that run on the OS, to perform the operations described herein with respect to FIGS. 1A-20, as only an example. The hardware components also access, manipulate, process, create, and store data in response to execution of the instructions or software. For simplicity, the singular term "processing device", "processor", or "computer" may be used in the description of the examples described herein, but in other examples multiple processing devices, processors, or computers are used, or a processing device, processor, or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, remote processing environments, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1A-20 that perform the operations described herein may be performed by a processing device, processor, or a computer as described above executing processor or computer readable code, instructions, or software to perform the operations described herein.

Processor or computer readable code, instructions, or software to control a processing device, processor, or computer to implement the hardware components and perform the methods as described above may be written as computer programs, code segments, instructions or any combination thereof, for individually or collectively instructing or configuring the processing device, processor, or computer to operate as a machine or special-purpose computer to perform the operations performed by the hardware components and the methods as described above. In one example, the processor or computer readable code, instructions, or software include machine code that is directly executed by the processing device, processor, or computer, such as machine code produced by a compiler. In another example, the processor or computer readable code, instructions, or software include higher-level code that is executed by the processing device, processor, or computer using an interpreter. Based on the disclosure herein, and after an understanding of the same, programmers of ordinary skill in the art can readily write the processor or computer readable code, instructions, or software based on the block diagrams and the flow charts illustrated in the drawings and the corresponding descriptions in the specification, which disclose algorithms for performing the operations performed by the hardware components and the methods as described above.

The processor or computer readable code, instructions, or software to control a processing device, processor, or computer to implement the hardware components, such as discussed in any of FIGS. 1A-4 and 6, and perform the methods as described above in any of FIGS. 1A-20, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the computer readable code, instructions, or software and any associated data, data files, and data structures in a non-transitory manner and providing the processor or computer readable code, instructions, or software and any associated data, data files, and data structures to a processing device, processor, or computer so that the processing device, processor, or computer can execute the instructions. In one example, the processor or computer readable code, instructions, or software and any associated data, data files, and data structures are distributed over network-coupled computer systems so that the instructions and software and any associated data, data files, and data structures are stored, accessed, and executed in a distributed fashion by the processing device, processor, or computer.

As only an example, a processing device configured to implement a software or processor/computer readable code component to perform an operation A may include a processor programmed to run software or execute processor/computer readable code or instructions to control the processor to perform operation A. In addition, a processing device configured to implement a software or processor/computer readable code component to perform an operation A, an operation B, and an operation C may have various configurations, such as, for example, a processor configured to implement a software or processor/computer readable code component to perform operations A, B, and C; a first processor configured to implement a software or processor/computer readable code component to perform operation A, and a second processor configured to implement a software or processor/computer readable code component to perform operations B and C; a first processor configured to implement a software or processor/computer readable code component to perform operations A and B, and a second processor configured to implement a software or processor/computer readable code component to perform operation C; a first processor configured to implement a software or processor/computer readable code component to perform operation A, a second processor configured to implement a software or processor/computer readable code component to perform operation B, and a third processor configured to implement a software or processor/computer readable code component to perform operation C; a first processor configured to implement a software or processor/computer readable code component to perform operations A, B, and C, and a second processor configured to implement a software or processor/computer readable code component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

As a non-exhaustive example only, a system or apparatus as described herein, such as any of the surround viewing systems of FIGS. 1A-4, as only examples, may be a mobile device, such as a vehicle or a component of a vehicle, or a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, or a global positioning system (GPS) navigation device, as only examples.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is not limited by the detailed description, but further supported by the claims and their equivalents, and all variations within the scope of the claims and their equivalents are to be construed as being included in the disclosure.

What is claimed:

1. A surround viewing method, the method comprising:
generating, by a vehicle, a first image of the vehicle based on a surrounding image of the vehicle;
receiving a second image generated by another vehicle on a road;
determining a location relationship between the vehicle and the another vehicle;
generating an extended image using the first image and the second image; and
outputting the generated extended image,
wherein the generating of the extended image comprises:
selecting, based on the location relationship, an overlapping area that appears in both the first image and the second image, and
generating the extended image to include the overlapping area.

2. The method of claim 1, wherein the outputting of the generated extended image comprises outputting the generated extended image to a display and controlling the display to display the extended image with additional information received from the another vehicle regarding any one or any combination of the another vehicle and an object in the second image.

3. The method of claim 1, further comprising receiving the surrounding image of the vehicle from a road side equipment (RSE) separate from the vehicle.

4. The method of claim 1, wherein the generating of the extended image comprises:
adjusting a position of at least one of a virtual viewpoint of the first image or a virtual viewpoint of the second image; and
generating the extended image based on a result of the adjusting.

5. The method of claim 1, wherein the generating of the extended comprises:
adjusting an image size of at least one of the first image or the second image; and
generating the extended image based on a result of the adjusting.

6. The method of claim 5, wherein the adjusting of the image size further comprises adjusting the image size of at least one of the first image or the second image based on at least one of position information of respective virtual viewpoints of the first and second images, angle information of the respective virtual viewpoints, or respective scale information of the first and second images.

7. The method of claim 1, wherein the generating of the extended image comprises aligning the first image and the second image based on a determined correlation between the first image and the second image.

8. The method of claim 1, further comprising:
receiving, from road side equipment (RSE), a surrounding image of a surrounding region of the RSE;
wherein the generating of the extended image comprises generating the extended image by combining the first image, the second image, and the surrounding image received from the RSE.

9. The method of claim 8, wherein the generating of the extended image comprises adjusting, based on a result of the aligning, a position of a virtual viewpoint of the second image to be at a same position as a virtual viewpoint of the first image.

10. The method of claim 1, further comprising:
adjusting a position of a virtual viewpoint of the first image, based on a location of the other vehicle, to generate an adjusted first image; and
transmitting, to the other vehicle, the adjusted first image.

11. The method of claim 1, further comprising:
transmitting additional information to the other vehicle,
wherein the additional information comprises at least one of identification (ID) information of the vehicle, speed information of the vehicle, height information of a virtual viewpoint of the first image, angle information of the virtual viewpoint of the first image, resolution information of the first image, scale information computed by the vehicle, location information of the vehicle, or traffic information obtained by the vehicle.

12. The method of claim 1, wherein the generating of the first image comprises generating a top-view image of the vehicle based on the surrounding image.

13. The method of claim 12, wherein the generating of the first image comprises generating the top-view image by reducing respective distances between pixels corresponding to a short-range region of the surrounding image relative to a location of the vehicle and increasing respective distances between pixels corresponding to a long-range region of the surrounding image relative to a location of the vehicle.

14. The method of claim 1, further comprising:
receiving additional information from the other vehicle,
wherein the additional information comprises at least one of ID information of the other vehicle, speed information of the other vehicle, height information of a virtual viewpoint of the second image, angle information of the virtual viewpoint of the second image, resolution information of the second image, scale information computed by the other vehicle, location information of the other vehicle, or traffic information obtained using the other vehicle.

15. The method of claim 14, wherein the generating of the extended image includes combining image information from the first image and the second image with image information representing one or more of the additional information received from the other vehicle.

16. The method of claim 1, wherein the outputting of the generated extended image comprises incorporating at least one of traffic information or obstacle information in the extended image.

17. The method of claim 1, wherein the extended image omnidirectionally represents a region surrounding the vehicle that is larger than a region surrounding the vehicle represented by the first image of the vehicle.

18. A non-transitory computer-readable medium storing instructions, that when executed by a processor cause the processor to perform the method of claim 1.

19. The method of claim 1, further comprising
selecting, based on a condition, the first image or the second image to use to generating the overlapping area in the extended image, and excluding the non-selected first image or second image from being used to generate the overlapping area.

20. The method of claim 1, wherein the first image or the second image used to generate the overlapping area in the extended image is selected based on any one or any combination of an image resolution and quality of communication from the another vehicle.

21. A surround viewing method performed by a first vehicle, the method comprising:
generating a first image of a vehicle, for a surrounding view of the first vehicle;
receiving a second image generated by another vehicle on a road for a surrounding view of the other vehicle;
determining a location relationship between the vehicle and the other vehicle;
determining, based on the location relationship, an overlapping area that appears in both the first image and the second image;
adjusting at least one of an image size of the first image, an image size of the second image, a position of a virtual viewpoint of the first image, or a position of a virtual viewpoint of the second image, to respectively generate an adjusted first image of the vehicle and/or an adjusted second image of the another vehicle;
generating an extended image including the overlapping area by combining one of the first image or the adjusted first image with one of the second image or the adjusted second image, based on a result of the adjusting;
outputting the generated extended image; and
transmitting the generated image of the vehicle or the adjusted image of the vehicle to the other vehicle.

22. The method of claim 21, further comprising transmitting, to the other vehicle, additional information regarding the generated image of the vehicle.

23. A non-transitory recording medium comprising processor readable code to control at least one processing device to implement the method of claim 21.

24. A surround viewing apparatus, the apparatus comprising:
an image generator configured to generate a first image of a vehicle based on a surrounding image of the vehicle;
a receiver configured to receive a second image generated by another vehicle on a road; and
an extended image generator configured to
determine a location relationship between the vehicle and the another vehicle;
create an extended image using the first image and the second image,
select, based on the location relationship, an overlapping area that appears in both the first image and the second image, and
generate the extended image to include the overlapping area; and
a display configured to display the generated extended image.

25. The apparatus of claim 24, wherein the extended image generator further comprises:
an image converter configured to adjust at least one of an image size of the first image, an image size of the second image, a position of a virtual viewpoint of the first image, or a position of a virtual viewpoint of the second image, to generate at least one of an adjusted image of the vehicle or adjusted image of the another vehicle;
an image aligner configured to align one of the first image and the adjusted first image with one of the second image and the adjusted second image, and to generate aligned first and second images, based on a result of the adjusting; and
an image generator configured to generate the extended image by combining the aligned first and second images based on a result of the selecting.

* * * * *